United States Patent
Yuasa et al.

(10) Patent No.: US 9,336,089 B2
(45) Date of Patent: May 10, 2016

(54) PROCESSING APPARATUS, METHOD, AND NON-TRANSITORY COMPUTER-READABLE STORAGE MEDIUM

(71) Applicant: FUJITSU LIMITED, Kawasaki-shi, Kanagawa (JP)

(72) Inventors: Kentarou Yuasa, Chofu (JP); Takanori Ishii, Nerima (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 14/249,586

(22) Filed: Apr. 10, 2014

(65) Prior Publication Data

US 2014/0317436 A1    Oct. 23, 2014

(30) Foreign Application Priority Data

Apr. 23, 2013 (JP) ................. 2013-090034

(51) Int. Cl.
*G06F 11/00* (2006.01)
*G06F 11/14* (2006.01)
*G06F 1/26* (2006.01)
*G06F 1/30* (2006.01)
*G06F 1/32* (2006.01)

(52) U.S. Cl.
CPC ............ *G06F 11/1441* (2013.01); *G06F 1/263* (2013.01); *G06F 1/30* (2013.01); *G06F 1/324* (2013.01); *G06F 1/3296* (2013.01); *Y02B 60/1217* (2013.01); *Y02B 60/1285* (2013.01)

(58) Field of Classification Search
CPC ............ G06F 11/1441; G06F 11/1412; G06F 11/1448; G06F 1/32; G06F 1/324; G06F 1/263; G06F 1/30; G06F 1/3296; Y02B 60/1217; Y02B 60/1285

USPC .......................... 714/24, 6.1, 22, 3
See application file for complete search history.

(56) References Cited

U.S. PATENT DOCUMENTS

| 7,392,429 | B2 * | 6/2008 | Frank .................. G06F 1/30 714/22 |
| 2004/0103238 | A1 * | 5/2004 | Avraham ............ G06F 11/1441 711/102 |
| 2004/0193955 | A1 * | 9/2004 | Leete .................. H04L 1/22 714/22 |
| 2005/0270927 | A1 | 12/2005 | Hayashi |
| 2008/0010514 | A1 * | 1/2008 | Liu ..................... G06F 11/1441 714/14 |
| 2010/0180065 | A1 * | 7/2010 | Cherian ............. G06F 12/0804 711/103 |

(Continued)

FOREIGN PATENT DOCUMENTS

| JP | 2005-10972 | 1/2005 |
| JP | 2005-346321 | 12/2005 |

(Continued)

*Primary Examiner* — Joseph D Manoskey
(74) *Attorney, Agent, or Firm* — Staas & Halsey LLP

(57) ABSTRACT

A processing apparatus includes a first memory, a second memory, a capacitor, and a processor coupled to the first memory and the second memory. The processor is configured to cause power feeding from the capacitor, and execute a first processing to cause the first memory to hold data, after the power feeding is caused from the capacitor, cause a battery to start power feeding in at least one of a case where the power feeding from an external power source is not started after being halted and an output voltage of the capacitor has fallen below a first value, and a case where the power feeding from the external power source is not started after being halted and a first time period has elapsed, and execute a second processing to write the data from the first memory into the second memory during the power feeding from the battery.

16 Claims, 18 Drawing Sheets

(56) References Cited

U.S. PATENT DOCUMENTS

2011/0208998 A1* 8/2011 Hosaka ............... G06F 11/1441 714/14
2012/0221891 A1* 8/2012 Shimizu ............. G06F 11/1441 714/15

FOREIGN PATENT DOCUMENTS

| JP | 2007-264755 | 10/2007 |
|----|-------------|---------|
| JP | 2009-5451   | 1/2009  |

* cited by examiner

FIG. 5

| VOLTAGE SETTING REGISTER | VOLTAGE REGISTER | | REMARKS |
|---|---|---|---|
| | INTEGER | AFTER DECIMAL POINT | |
| NORMAL OPERATION VOLTAGE (Cache OPERATION VOLTAGE) | '0' | EXAMPLE:1.5V →1011 0010 | HIGH-PERFORMANCE MODE →OPERATE AT MAXIMUM OPERATION FREQUENCY BY MAXIMIZING OPERATION VOLTAGE |
| LOWER LIMIT OPERATION VOLTAGE (Cache OPERATION VOLTAGE) | '0' | EXAMPLE:1.25V →1001 1001 | POWER SAVING MODE →REDUCE OPERATION VOLTAGE AND SUPPRESS POWER CONSUMPTION BY REDUCING OPERATION FREQUENCY |
| MINIMUM OPERATION VOLTAGE (Capacitor OUTPUT) | '0' | EXAMPLE:1.55V →1011 0111 | |

| DEVICE STATE | POWER FAILURE DETERMINATION REGISTER | | |
|---|---|---|---|
| | INPUT POWER SOURCE STATE | POWER FAILURE OCCURRENCE HISTORY | ACTIVATION MODE |
| AT TIME OF NORMAL ACTIVATION | '0' (INPUT POWER SOURCE NORMALLY FUNCTIONING) | '0' POWER FAILURE NOT HAVING OCCURRED YET | '00' |
| ACTIVATION IN CACHE DESTAGE MODE (STATE OF MAKING TRANSITION FROM MEMORY BACKUP MODE TO CACHE DESTAGE MODE OWING TO PROLONGED PERIOD OF POWER FAILURE) | '1' (INPUT POWER SOURCE POWER FAILURE) | '1' (POWER FAILURE OCCURRENCE) | '01' |
| RESTORATION OF POWER FROM SHORT-TIME POWER FAILURE (ACTIVATION FROM MEMORY BACKUP MODE) | '0' (INPUT POWER SOURCE POWER FAILURE) | '1' (POWER FAILURE OCCURRENCE) | '10' |
| RESTORATION OF POWER FROM LONG-TIME POWER FAILURE (ACTIVATION AFTER CACHE DESTAGE MODE) | '0' (INPUT POWER SOURCE POWER FAILURE) | '1' (POWER FAILURE OCCURRENCE) | '11' |

FIG. 7

| DEVICE TYPE | MODULES VOLTAGES | | | NORMAL OPERATION VOLTAGE (Cache OPERATION VOLTAGE) | LOWER LIMIT OPERATION VOLTAGE (Cache OPERATION VOLTAGE) |
|---|---|---|---|---|---|
| | 1.5V | 1.35V | 1.25V | | |
| DDR3 SDRAM | ○ | ○ | ○ | 1.5V | 1.25V |
| | ○ | ○ | – | 1.5V | 1.35V |
| | ○ | – | – | 1.5V | 1.5V |
| DDR2 SDRAM | FIXED AT 1.8 V | | | 1.8V | 1.8V |
| DDR1 SDRAM | FIXED AT 2.5 V | | | 2.5V | 2.5V |

16e

PROCESSING APPARATUS, METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2013-090034, filed on Apr. 23, 2013, the entire contents of which are incorporated herein by reference.

FIELD

The embodiments discussed herein are related to a processing apparatus, a method, and a non-transitory computer-readable storage medium.

BACKGROUND

In recent years, as various types of data have been computerized and used on computers, storage devices such as disk array devices have become more important that are capable of efficiently storing therein large amounts of data independently from computers. In the disk array device, by introducing a redundant arrays of inexpensive disks (RAID) technology, reliability is enhanced compared with a simple disk device. In addition, in general, by embedding a cache memory, an access time for data is shortened.

In the RAID technology, using, for example, a method (RAID-1) for memorizing same data in a plurality of disks, a method (RAID-5) for dispersing and memorizing parity information in a disk, or the like, reliability is enhanced. In addition to this, it has been known that reliability is enhanced using a method for performing data protection by writing, into a disk, information called a block check code, a method (mirroring) for saving same data using two cache memories, or the like.

In addition to the above-mentioned logical data protection, artifices have been developed that are used for enhancing physical or electric reliability. As one of such artifices, a technique has also been known that avoids loss of data in processing during a power failure. The summary of a technique applied to a disk array device during a power failure is as follows. When the disk array device has detected the power failure, a controller module (CM) halts running processing, and protects data (cache data) within a volatile cache memory, which is to disappear owing to power shutoff. Here, as a data protection operation, there are two methods such as a memory backup method and a cache destage method.

The memory backup method is a method for causing a cache memory to make a transition to a low-power mode such as self-refresh at the time of a power failure and continuing supplying electric power from a battery to the cache memory in a state where power consumption is suppressed. In the memory backup method, since it is desirable to continue supplying electric power to the cache memory, a time period during which it is possible to back up and hold data in the cache memory is several days. Accordingly, in a case where an external power source is shut off for a long time period, there is a possibility that the backup data is lost. However, since it is possible to back up data to the cache memory with, for example, a low voltage of about 1.8 V and discharging of a small current, it is possible to downsize the battery.

The cache destage method is a method for supplying electric power from a battery at the time of a power failure and writing data within a cache memory into a non-volatile memory. To write data within a cache memory into a non-volatile memory is called destage. In the cache destage method, since cache data is written into the non-volatile memory, no restriction is put on a time period during which it is possible to back up and hold the cache data. In this regard, however, a time taken for backup processing in which the cache data is written into the non-volatile memory is dependent on the capacity of the cache memory or the number of non-volatile memories serving as writing destinations and ranges from several tens of seconds to several tens of minutes in some cases. In addition, in the cache destage method, the number of circuits to which electric power is to be supplied at this time of backup processing is larger than the memory backup method. Therefore, for example, a high voltage of about 12 V and discharging of a large current are desired in writing the cache data into the non-volatile memory, and a capacity desired for the battery becomes large.

Here, with reference to FIG. 15 to FIG. 18, power systems of storage devices to which the above-mentioned memory backup method and cache destage method are applied will be specifically described. In addition, FIG. 15 and FIG. 16 are diagrams illustrating power systems at the time of a normal operation and at the time of a power failure, respectively, in a storage device to which the memory backup method is applied. In addition, FIG. 17 and FIG. 18 are diagrams illustrating power systems at the time of a normal operation and at the time of a power failure, respectively, in a storage device to which the cache destage method is applied.

Controller enclosures (CEs) illustrated in FIG. 15 to FIG. 18 are provided between host computers (hereinafter, referred to as "hosts") not illustrated and disk enclosures (DEs) not illustrated and perform management of resources in storage devices and so forth. In the CE, two respective CMs indicated as a CM#0 and a CM#1, two respective power supply units (PSUs) indicated as a PSU#0 and a PSU#1, and three respective battery backup units (BBUs) indicated as a BBU#0 to a BBU#2 are provided.

At the time of the normal operation, the PSUs generate system power using external power sources supplied from the outside of a device, and charge the individual BBUs at the same time as supplying the system power to the individual CMs to cause the device to operate. The BBU#0 to BBU#2 supply electric power to the individual CMs at the time of the occurrence of a power failure. In addition, the BBU#0 to BBU#2 include respective battery control units (BCUs) indicated as a BCU#0 to a BCU#2 and respective battery units (BTUs) indicated as a BTU#0 to a BTU#2, respectively. Each BCU controls charging and discharging of each BTU.

In addition, each CM includes a central processing unit (CPU), a cache memory (Cache), a non-volatile memory, a fan, a host interface (Host I/F), and a disk interface (Disk I/F). The CPU executes processing in accordance with an operating system (OS) or the like, performs various kinds of control, and fulfills various kinds of functions by executing a program saved in the non-volatile memory. The non-volatile memory saves therein various kinds of information in addition to the above-mentioned program. The cache memory is an area primarily storing therein data whose usage frequency is high, as cache data. The fan cools the CPU. The host I/F performs interface control between the host and the CPU, and performs data communication between the host and the CPU. The disk I/F performs interface control between the disk of the DE and the CPU, and performs data communication between the disk of the DE and the CPU.

In the power system at the time of the normal operation of the storage device to which the memory backup method is applied, the two PSUs generate system power using the external power sources, and charge the individual BBUs at the same time as supplying the system power to the individual CMs to cause the device to operate, as illustrated by solid line arrows in FIG. 15. At this time, in each CM, the electric power is supplied to all of the CPU, the non-volatile memory, the cache memory, the fan, the host I/F, and the disk I/F. On the other hand, when a power failure has occurred, the external power sources have been shut off, and no system power has been supplied from the two PSUs, power feeding for the cache memory serving as a backup target within each CM is performed by discharging from the three BBUs, as illustrated by solid line arrows in FIG. 16. Owing to this, backup processing for protecting data held in the cache memory is performed.

In the power system at the time of the normal operation of the storage device to which the cache destage method is applied, the two PSUs charge the individual BBUs at the same time as supplying the system power to the individual CMs to cause the device to operate, in the same way as the memory backup method, as illustrated by solid line arrows in FIG. 17. At this time, in each CM, electric power is supplied to all of the CPU, the non-volatile memory, the cache memory, the fan, the host I/F, and the disk I/F. On the other hand, when a power failure has occurred, the external power sources have been shut off, and no system power has been supplied from the two PSUs, power feeding for the CPU, the non-volatile memory, the cache memory, and the fan serving as backup targets within each CM is performed by discharging from the three BBUs, as illustrated by solid line arrows in FIG. 18. In addition, during the power feeding, cache destage processing for writing data within the cache memory into the non-volatile memory is executed.

In this way, in the case of the memory backup method, while the BBUs perform backup of power supply on the cache memories when backup is performed owing to a power failure or the like, the CPU, the non-volatile memory, the fan, the host I/F, and the disk I/F are out of the backup. On the other hand, in the case of the cache destage method, backup targets based on the BBUs at the time of backup are the CPU, the non-volatile memory, the cache memory, and the fan, and the host I/F and the disk I/F are backup non-targets. As techniques of the related art, Japanese Laid-open Patent Publication No. 2005-10972, Japanese Laid-open Patent Publication No. 2005-346321, Japanese Laid-open Patent Publication No. 2007-264755, and Japanese Laid-open Patent Publication No. 2009-5451 have been known.

SUMMARY

According to an aspect of the invention, a processing apparatus includes a first memory, a second memory, a capacitor, and a processor coupled to the first memory and the second memory. The processor is configured to, when power feeding from an external power source to the processing apparatus is halted, cause power feeding from the capacitor to the first memory, and execute a first processing to cause the first memory to hold data, after the power feeding is caused from the capacitor, cause a battery to start power feeding to the second memory in at least one of a case where the power feeding from the external power source is not started after being halted and an output voltage of the capacitor has fallen below a first value after execution of the first processing, and a case where the power feeding from the external power source is not started after being halted and a first time period has elapsed after execution of the first processing, and execute a second processing to write the data from the first memory into the second memory during the power feeding from the battery.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of data set in a voltage setting register in the present embodiment;

FIG. 6 is a diagram illustrating an example of data set in a power failure determination register in the present embodiment;

FIG. 7 is a diagram illustrating an example of a cache operation voltage judgment table in the present embodiment;

DESCRIPTION OF EMBODIMENTS

While a power failure is restored to its former state within a short time period of a matter of seconds to minutes in many cases, a power failure continues over a long time period, for example, several days, owing to an earthquake disaster or the like. While, in a memory backup method, as described above, it is possible to downsize a battery, a backup time period is several days. Therefore, if a power failure has continued over several days, there is a possibility that backup data is lost. Therefore, it is not desirable that the memory backup method is applied to a core system. Accordingly, in the core system, to use a cache destage method for saving backup data in a non-volatile memory is beneficial.

In the cache destage method, a secondary battery such as a lead battery or a nickel metal-hydride rechargeable battery, whose energy amount is large, is usually used as a battery. However, since, in such a secondary battery, the lifetime is shortened when charging and discharging are repeated, the operational lifetime (for example, about five years) is not satisfied, in some cases. In other words, in a case where the secondary battery performs charging and discharging every time a power failure to be restored to its former state occurs, when a long-lasting power failure has occurred in an emergency, it is difficult for the secondary battery to perform discharging with a high voltage and a large current so as to write cache data into a non-volatile memory, and it becomes difficult to back up the cache data.

With reference to FIG. 1 to FIG. 10, the hardware configurations and functional configurations of a storage device 1 and a control device is in the present embodiment will be described.

Figure 1:
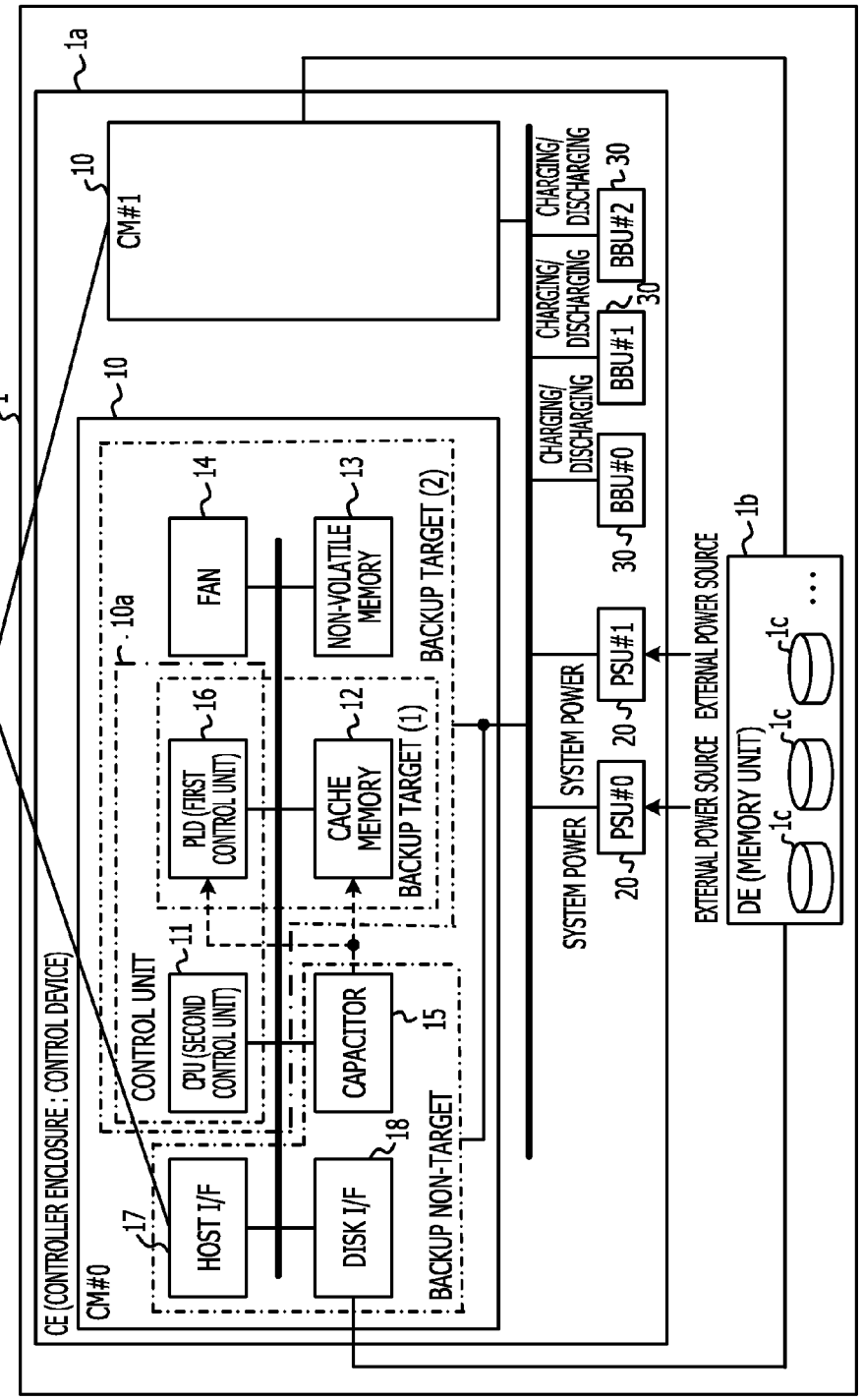
FIG. 1 is a block diagram illustrating hardware configurations and functional configurations of a storage device and a control device in the present embodiment.

FIG. 1 is a block diagram illustrating the hardware configurations and functional configurations of the storage device 1 and the control device is in the present embodiment.

As illustrated in FIG. 1, the storage device 1 in the present embodiment is, for example, a RAID device, receives various kinds of requests from a host 2, and performs various kinds of processing according to such requests. The storage device 1 includes a CE 1a and a DE 1b. The CE 1a a control device, and the DE is a memory unit.

The CE 1a is provided between the host 2 and the DE 1b and performs management of resources, and so forth in the storage device 1. In the CE 1a, two respective CMs 10 indicated as a CM#0 and a CM#1, two respective PSUs 20 indicated as a PSU#0 and a PSU#1, and three respective BBUs 30 indicated as a BBU#0 to a BBU#2 are provided.

Figure 8:
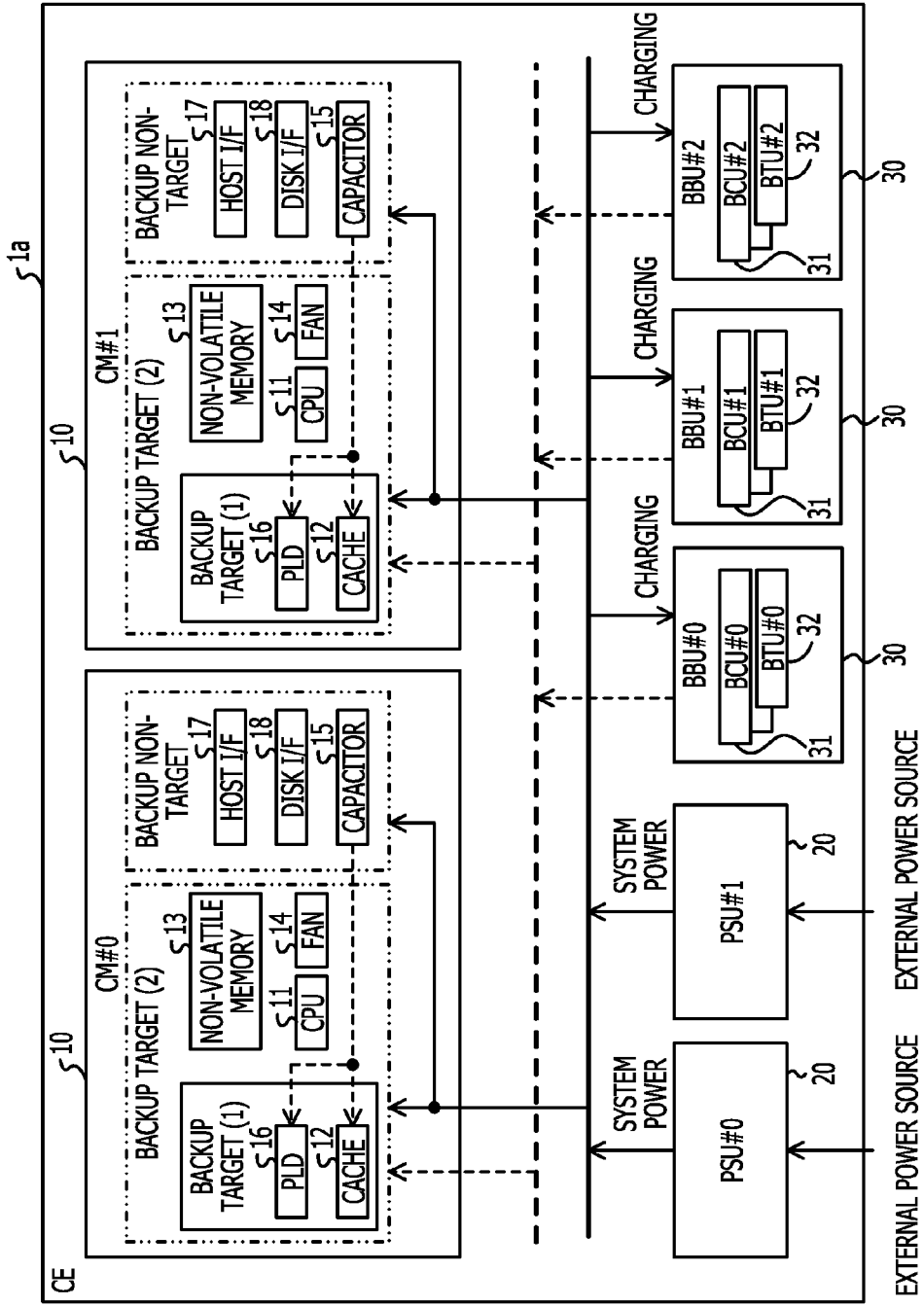
FIG. 8 is a diagram illustrating a power system at the time of a normal operation of a storage device in the present embodiment.
Figure 9:
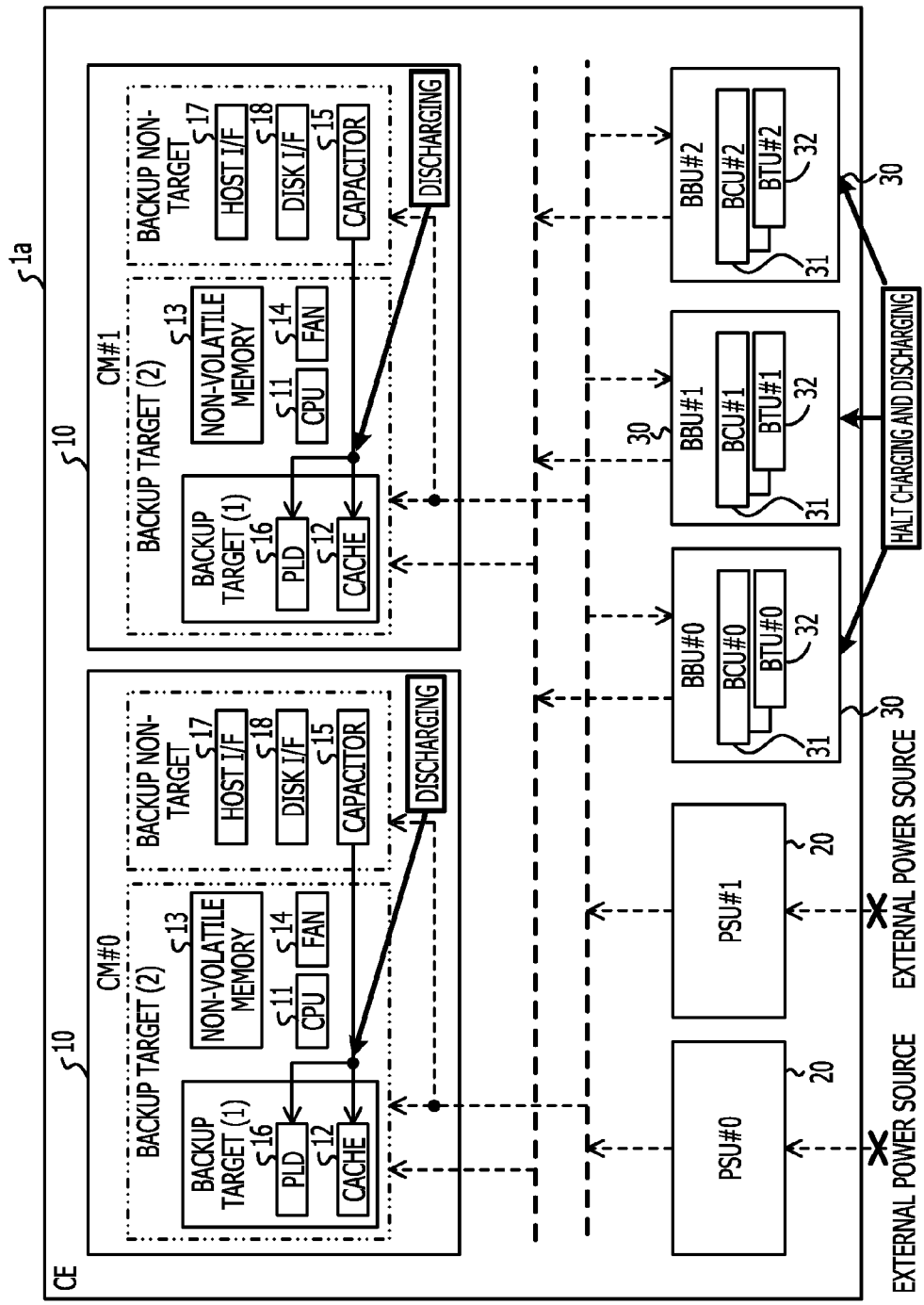
FIG. 9 is a diagram illustrating a power system at the time of memory backup processing of a storage device in the present embodiment.
Figure 10:
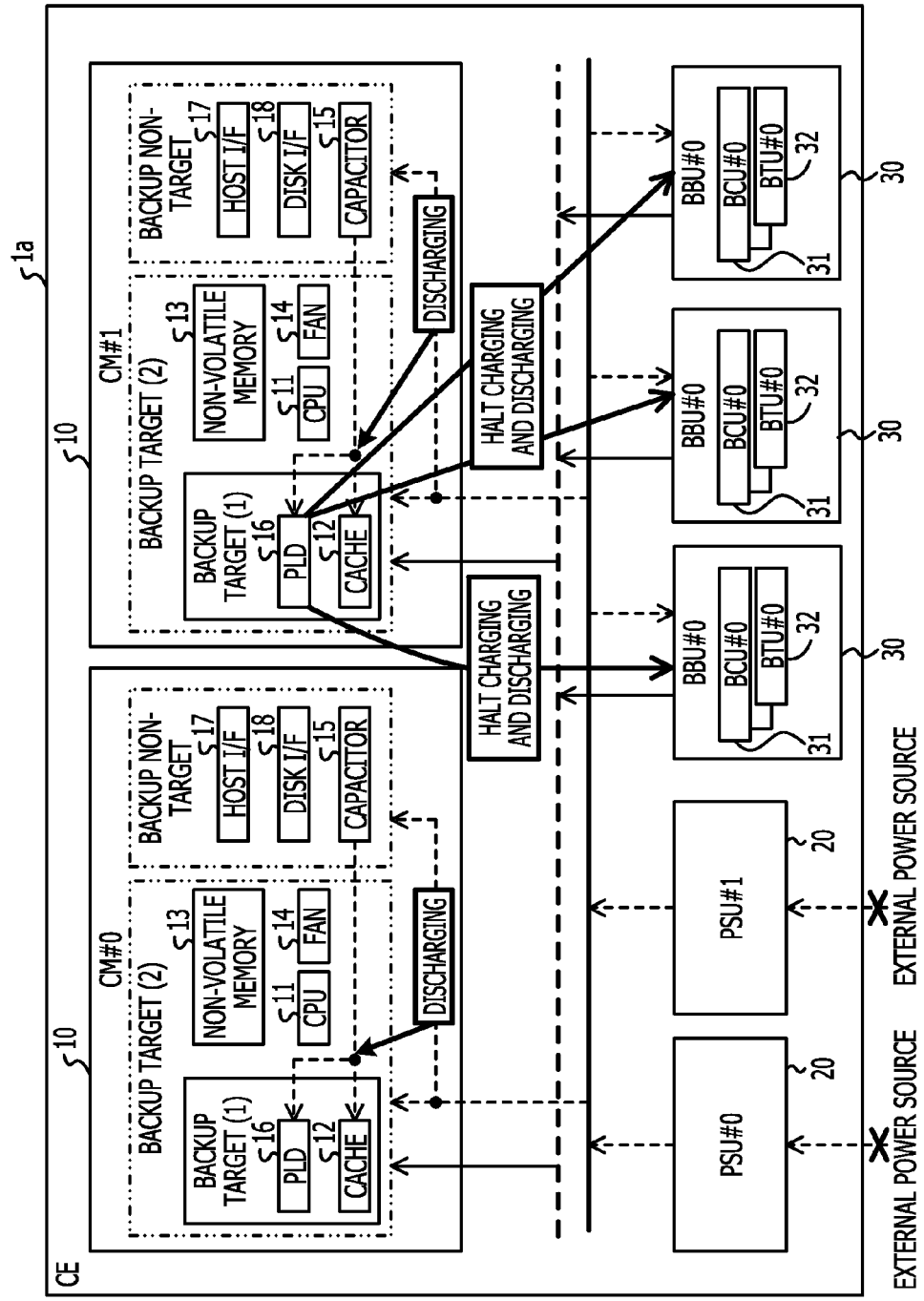
FIG. 10 is a diagram illustrating a power system at the time of cache destage processing of a storage device in the present embodiment.

At the time of a normal operation, the PSUs 20 generate system power using external power sources supplied from the outside of a device, and charge the individual BBUs 30 and the after-mentioned capacitors 15 at the same time as supplying the system power to the individual CMs 10 to cause the device 1 to operate. At the time of the occurrence of a power failure, in particular, at the time of the after-mentioned cache destage processing in the present embodiment, the BBUs 30 supply electric power to backup targets (2) in the individual CMs 10. As illustrated in FIG. 8 to FIG. 10, the BBU#0 to BBU#2 include respective BCUs 31 indicated as a BCU#0 to a BCU#2 and respective BTUs 32 indicated as a BTU#0 to a BTU#2, respectively. The individual BCUs 31 control charging and discharging of the individual BTUs 32. The individual BTUs 32 are secondary batteries such as lead batteries or nickel metal-hydride rechargeable batteries.

While, in FIG. 1, the configuration of the CM#0 is only illustrated, both the CM#1 also has the same configuration as the CM#0. In addition, the number of the CMs 10 is not limited to two, and one CM 10 or three or more CMs 10 may also be provided. The DE 1b includes a plurality of disks 1c. Each disk 1c is, for example, a hard disk drive (HDD), and stores and memorizes therein user data accessed and used by the host 2, various kinds of control information, and so forth. While, in the present embodiment, the HDD 1c is provided in the DE 1b, a solid state device (SSD) or the like may also be provided in place of the HDD 1c.

Each CM 10 includes a CPU 11, a cache memory 12, a non-volatile memory 13, a fan 14, a Capacitor 15, a programmable logic device (PLD) 16, a host I/F 17, and a disk I/F 18.

The CPU 11 executes processing in accordance with an operating system (OS) or the like, performs various kinds of control, and fulfills various kinds of functions by executing a program saved in the non-volatile memory 13. In particular, the CPU 11 fulfills a function as the after-mentioned second control unit, and configures the after-mentioned control unit 10a in collaboration with a PLD 16.

The cache memory 12 is an area primarily storing therein data whose usage frequency is high, as cache data, and utilizes a fast double inline memory module (DIMM). Since the cache memory 12 is a volatile memory, it is desirable to save cache data in a non-volatile area or continuously perform power feeding for the cache memory 12, so as to hold data in process at the time of a power failure.

Figure 3:
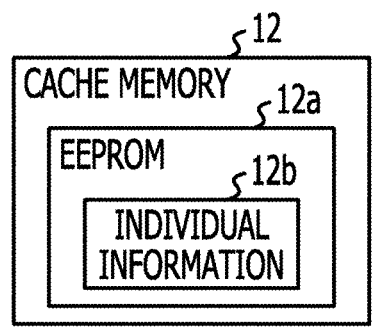
FIG. 3 is a block diagram illustrating data saved in an EEPROM in a cache memory in the present embodiment.

In addition, as illustrated in FIG. 3, in the cache memory 12, an electrically erasable and programmable read only memory (EEPROM) 12a is provided as a non-volatile memory area, and the individual information 12b of the cache memory 12 is saved in the EEPROM 12a. The individual information 12b of the cache memory 12 is, for example, a maximum frequency (for example, 1333 MHz), the device type or module type of a dynamic random access memory (DRAM). In addition, FIG. 3 is a block diagram illustrating data saved in the EEPROM 12a in the cache memory 12 in the present embodiment.

The non-volatile memory 13 saves therein various kinds of information in addition to the above-mentioned program. In addition to this, at the time of the cache destage processing, cache data saved in the cache memory 12 is written into the non-volatile memory 13, and the non-volatile memory 13 saves therein the cache data.

The fan 14 receives power supply to be driven at the time of the normal operation and at the time of the after-mentioned cache destage processing, and cools the CPU 11.

The capacitors 15 are charged by the PSUs 20 at the time of the normal operation, and supply electric power to backup targets (1) in the individual CMs 10 at the time of the occurrence of a power failure, in particular, at the time of the after-mentioned memory backup processing in the present embodiment. The capacitor 15 is an electric double-layer capacitor (EDLC), a lithium ion capacitor (LIC), or the like.

Figure 4:
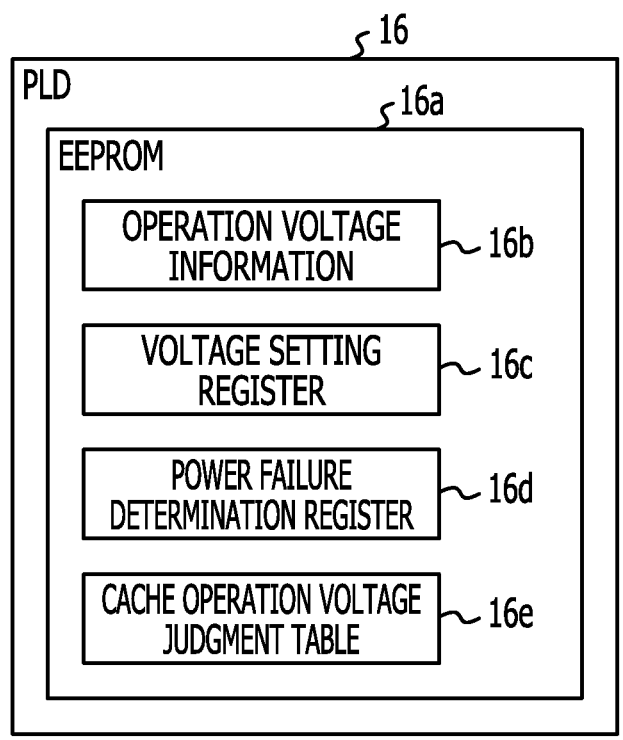
FIG. 4 is a block diagram illustrating data saved in an EEPROM in a PLD (first control unit) in the present embodiment.

The PLD 16 has control logic for properly utilizing the capacitor 15 and the BBU 30 serving as two types of backup power source, fulfills a function as the after-mentioned first control unit, and configures the after-mentioned control unit 10a in collaboration with the CPU 11. As illustrated in FIG. 4, in the PLD 16, an EEPROM 16a is provided as a non-volatile memory area, and operation voltage information 16b, a voltage setting register 16c, a power failure determination register 16d, and a cache operation voltage judgment table 16e are saved in the EEPROM 16a. FIG. 4 is a block diagram illustrating data saved in the EEPROM 16a in the PLD 16 in the present embodiment. The operation voltage information 16b includes the operation voltage of the PLD 16. Specific pieces of data set in the voltage setting register 16c and the power failure determination register 16d will be described later with reference to FIG. 5 and FIG. 6, respectively. The cache operation voltage judgment table 16e will be described later with reference to FIG. 7.

The host I/F 17 performs interface control between the host 2 and the CPU 11, and performs data communication between the host 2 and the CPU 11. The disk I/F 18 performs interface control between the disk is in the DE 1b and the CPU 11, and performs data communication between the disk is in the DE 1b and the CPU 11.

Figure 2:
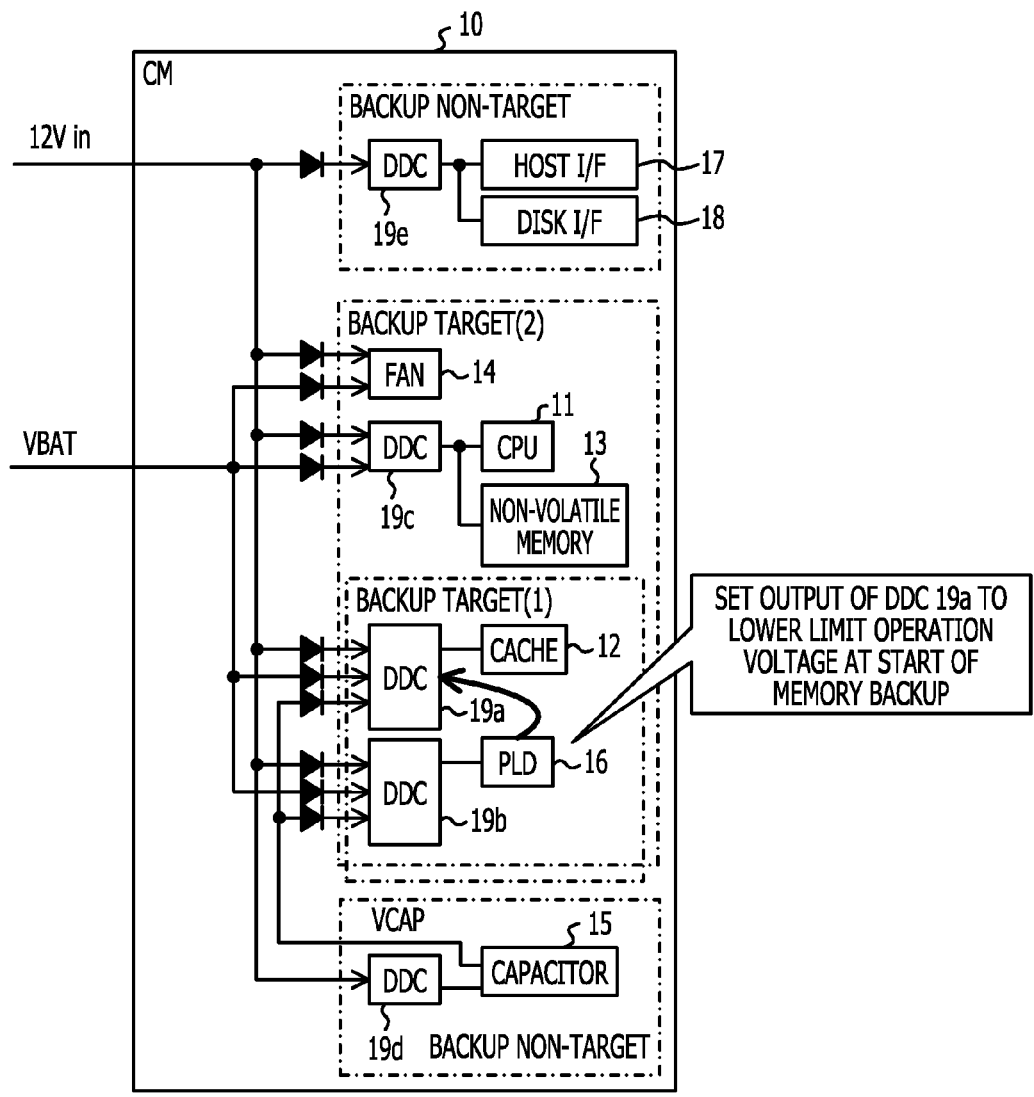
FIG. 2 is a block diagram illustrating a detailed configuration of a power system in a control device in the present embodiment.

Next, with reference to FIG. 2, the detailed configuration of a power system in the CE 1a (each CM 10) in the present embodiment will be described. FIG. 2 is a block diagram illustrating the detailed configuration of a power system in the CE 1a (each CM 10) in the present embodiment.

As illustrated in FIG. 2, the host I/F 17 and the disk I/F 18 belong to backup non-targets that do not receive power feeding based on the capacitor 15 or the BBU 30, in other words, backup of electric power, at the time of a power failure. The host I/F 17 and the disk I/F 18 receive power supply via a DDC direct current to direct current converter (DDC) 19e at the time of the normal operation. At the time of the normal operation, a voltage from the PSU 20, for example, 12 V, is input to the DDC 19e, and fed to the host I/F 17 and the disk I/F 18 after being converted into a predetermined voltage. In addition, at the time of a power failure, the DDC 19e is not power-fed from any one of the PSU 20, the capacitor 15, and the BBU 30, and the host I/F 17 and the disk I/F 18 are put into states of not being subjected to backup, in other words, halting states.

The capacitor 15 belongs to backup non-targets, receives power supply via a DDC 19d at the time of the normal operation, for example, at the time of device activation, and is charged. At the time of the normal operation, a voltage from the PSU 20, for example, 12 V, is input to the DDC 19d, and fed to the capacitor 15 after being converted into a predetermined voltage. In addition, the capacitor 15 performs power feeding (a voltage VCAP) for the after-mentioned backup target (1) at the time of the after-mentioned memory backup processing, and the discharging thereof is halted at the time of the after-mentioned cache destage processing.

The cache memory 12 and the PLD 16 belong to both the backup target (1) to receive power feeding at the time of the memory backup processing and the backup target (2) to receive power feeding at the time of the cache destage processing. The cache memory 12 and the PLD 16 receive power supply to operate, via the DDCs 19a and 19b, respectively.

In other words, at the time of the normal operation, a voltage (12 V in) from the PSU 20 is input to the DDC 19a, and fed to the cache memory 12 after being converted into a predetermined voltage. In addition, at the time of the memory backup processing, the voltage VCAP from the capacitor 15 is input to the DDC 19a, and fed to the cache memory 12 after being converted into a lower limit operation voltage set by the PLD 16. Furthermore, at the time of the cache destage processing, a voltage VBAT from the BBU 30 is input to the DDC 19a, and fed to the cache memory 12 after being converted into the lower limit operation voltage set by the PLD 16.

In the same way, at the time of the normal operation, a voltage (12 V in) from the PSU 20 is input to a DDC 19b, and fed to the PLD 16 after being converted into a predetermined voltage. In addition, at the time of the memory backup processing, the voltage VCAP from the capacitor 15 is input to the DDC 19b, and fed to the PLD 16 after being converted into a predetermined voltage. Furthermore, at the time of the cache destage processing, the voltage VBAT from the BBU 30 is input to the DDC 19b, and fed to the PLD 16 after being converted into a predetermined voltage.

The CPU 11 and the non-volatile memory 13 belong to the backup target (2), and receive power supply to operate, via a DDC 19c at the time of the normal operation. In other words, at the time of the normal operation, a voltage (12 V in) from the PSU 20 is input to the DDC 19c, and fed to the CPU 11 and the non-volatile memory 13 after being converted into a predetermined voltage. In addition, at the time of the cache destage processing, the voltage VBAT from the BBU 30 is input to the DDC 19c, and fed to the CPU 11 and the non-volatile memory 13 after being converted into a predetermined voltage. Furthermore, at the time of the memory backup processing, the DDC 19c is not power-fed from any one of the PSU 20, the capacitor 15, and the BBU 30, and the CPU 11 and the non-volatile memory 13 are put into states of not being subjected to backup, in other words, halting states.

The fan 14 belongs to the backup target (2). In addition, at the time of the normal operation, the fan 14 is driven by receiving power feeding (a voltage 12 V in) from the PSU 20, and cools the CPU 11. In addition, at the time of the cache destage processing, the fan 14 is driven by receiving power feeding (the voltage VBAT) from the BBU 30 and cools the CPU 11. On the other hand, at the time of the memory backup processing, the fan 14 is not power-fed by any one of the PSU 20, the capacitor 15, and the BBU 30, and is put into a state of not being subjected to backup, in other words, a halting state.

Next, with reference to FIG. 1 to FIG. 10, the functional configurations of the storage device 1 and the CE 1a in the present embodiment will be described.

In the storage device 1 and the CE 1a in the present embodiment, a device operation at the time of the occurrence of a power failure is divided into processing operations of two stages. In other words, at the time of the occurrence of a power failure, cache data is protected based on the memory backup method, using the capacitor 15 such as the EDLC or the LIC. In addition, in a case where after the data protection based on the memory backup method has been started after the occurrence of a power failure, a power failure state is not resolved even if the output voltage of the capacitor 15 has fallen below a predetermined value or a predetermined time has elapsed, the cache data is protected based on the cache destage method, using the BBU 30 (BTU 32) such as the lead battery or the nickel metal-hydride rechargeable battery. In order to realize such processing, the storage device 1 and the CE 1a in the present embodiment have the following functional configurations.

In performing backup of cache data associated with a power failure, the CPU 11 and the PLD 16 function as the control unit 10a causing one of the memory backup processing serving as first processing and the cache destage processing serving as second processing to be executed. Here, the memory backup processing serving as the first processing is processing for holding the cache data in the cache memory 12 using power feeding from the capacitor 15. In addition, the cache destage processing serving as the second processing is processing for writing the cache data from the cache memory 12 into the non-volatile memory 13 using power feeding from the BBU 30 (BTU 32).

At this time, when having received a power failure notice from the PSU 20, the control unit 10a causes the memory backup processing to be executed, and when a predetermined condition is satisfied after the execution of the memory backup processing, the control unit 10a causes the cache destage processing to be executed. As the predetermined condition, it is set that a power failure state is not resolved even if the output voltage of the capacitor 15 has fallen below a predetermined value after the execution of the memory backup processing or a predetermined time has elapsed after the execution of the memory backup processing. In addition, as the predetermined condition, it may also be set that a power failure state is not resolved even if the output voltage of the capacitor 15 has fallen below a predetermined value after the execution of the memory backup processing and a predetermined time has elapsed after the execution of the memory backup processing.

In addition, in the present embodiment, as described above, the control unit 10a is configured by the CPU (second control unit) 11 and the PLD (first control unit) 16.

The PLD (first control unit) 16 has control logic for properly utilizing the capacitor 15 and the BBU 30, and instructs the CPU 11 to execute the memory backup processing when having received the power failure notice from the PSU 20. In addition, in a case where the predetermined condition is satisfied after the execution of the memory backup processing, the PLD 16 instructs the CPU 11 to execute the cache destage processing.

In a case where the determination of the predetermined condition is performed based on the output voltage of the capacitor 15, the PLD 16 has a function for monitoring the output voltage of the capacitor 15. At this time, as described later, based on a higher one out of the operation voltage of the PLD 16 and the lower limit operation voltage of the cache memory 12, the PLD 16 calculates and sets the predetermined value, in the voltage setting register 16c (refer to FIG. 4 and FIG. 5). In addition, in a case where the determination of the predetermined condition is performed based on an elapsed time after the execution of the memory backup processing, the PLD 16 has a timer function for starting timing at the time of the execution of the memory backup processing and timing an elapsed time after the execution of the memory backup processing.

The function as the second control unit, performed by the CPU 11, is realized by firmware (FW). While the CPU (second control unit) 11 executes the memory backup processing when having received an instruction to execute the memory backup processing from the PLD 16, the CPU (second control unit) 11 executes the cache destage processing when having received an instruction to execute the cache destage processing from the PLD 16 after having received the instruction to execute the memory backup processing.

In addition, when the storage device 1 is activated in response to a power failure restoration notice during the execution of the memory backup processing, the CPU 11 executes processing for writing the cache data in the cache memory 12 into the DE 1b (disk 1c). Furthermore, when the storage device 1 is activated in response to a power failure restoration notice after the execution of the cache destage processing, the CPU 11 executes processing for writing the cache data from the cache memory 12 into the DE 1b (disk 1c) after having written back the cache data in the non-volatile memory 13 into the cache memory 12.

Here, with reference to FIG. 2 and FIG. 8 to FIG. 10, power supply targets, in other words, backup targets will be individually described at the time of the normal operation, at the time of the execution of the memory backup processing, and at the time of the execution of the cache destage processing. In addition, FIG. 8 is a diagram illustrating a power system at the time of the normal operation of the storage device 1 (CE 1a) in the present embodiment. FIG. 9 is a diagram illustrating a power system at the time of the memory backup processing of the storage device 1 (CE 1a) in the present embodiment. FIG. 10 is a diagram illustrating a power system at the time of the cache destage processing of the storage device 1 (CE la) in the present embodiment.

At the time of the normal operation, as illustrated by solid line arrows in FIG. 8, power sources from the PSUs 20 (refer to the voltage 12 V in FIG. 2) are supplied to the CPUs 11, the cache memories 12, the non-volatile memories 13, the fans 14, the capacitors 15, the PLDs 16, the host I/Fs 17, and the disk I/Fs 18 in the individual CMs 10, and the individual BBUs 30. Owing to this, the CPUs 11, the cache memories 12, the non-volatile memories 13, the fans 14, the PLDs 16, the host I/Fs 17, and the disk I/Fs 18 operate as usual, and the capacitors 15 and the individual BBUs 30 are charged.

As illustrated in FIG. 9, at the time of the execution of the memory backup processing, discharging of the BBUs 30 is halted, and a power source from the capacitor 15 (refer to the voltage VCAP in FIG. 2) is supplied to the cache memory 12 and the PLD 16 included in the backup target (1) in each CM 10. Owing to this, the CPU 11 executes the memory backup processing, and the cache memory 12 holds the cache data with being managed by the PLD 16. In addition, discharging halt processing in each BBU 30 may also be executed by, for example, the BCU 31 having received a power failure notice from the PSU 20.

As illustrated in FIG. 10, at the time of the execution of the cache destage processing, discharging of the capacitor 15 is halted by a discharging halt instruction from the PLD 16, and discharging of each BBU 30 is started by a discharging instruction from the PLD 16. In addition, power sources (refer to the voltage VBAT in FIG. 2) from the individual BBUs 30 are supplied to the CPUs 11, the cache memories 12, the non-volatile memories 13, the fans 14, and the PLDs 16 included in the backup targets (2) in the individual CMs 10. Owing to this, the CPU 11 executes the cache destage processing, and writing of the cache data from the cache memory 12 into the non-volatile memory 13 is performed. In addition, the PLD 16 monitors the state of the writing of the cache data from the cache memory 12 into the non-volatile memory 13, and when all the cache data has been written into the non-volatile memory 13, discharging of the individual BBUs 30 is halted by a discharging halt instruction from the PLD 16.

In addition, in order to realize the above-mentioned function, the PLD 16 utilizes the operation voltage information 16b, the voltage setting register 16c, the power failure determination register 16d, and the cache operation voltage judgment table 16e in the EEPROM 16a, as described above. Here, with reference to FIG. 5 to FIG. 7, the operation voltage information 16b, the voltage setting register 16c, the power failure determination register 16d, and the cache operation voltage judgment table 16e will be described. FIG. 5 is a diagram illustrating an example of data set in the voltage setting register 16c in the present embodiment, FIG. 6 is a diagram illustrating an example of data set in the power failure determination register 16d in the present embodiment, and FIG. 7 is a diagram illustrating an example of the cache operation voltage judgment table 16e in the present embodiment.

As described above, the operation voltage information 16b includes the operation voltage of the PLD 16, for example, 1.2 V, and is used in calculating the after-mentioned minimum operation voltage.

The cache operation voltage judgment table 16e is preliminarily stored in the EEPROM 16a in the PLD 16. As illustrated in FIG. 7, in the cache operation voltage judgment table 16e, a normal operation voltage, for example, a cache operation voltage, and a lower limit operation voltage, for example, a cache operation voltage, are saved with being associated with each other, with respect to each of the device types or module types of the cache memory 12, for example, each module voltage. The normal operation voltage and the lower limit operation voltage will be described later with reference to FIG. 5. In addition, the lower limit operation voltage may also be written into a customer user data area within the EEPROM 16.

At the time of the device activation, the PLD 16 reads out the individual information 12b from the EEPROM 12a in the cache memory 12. In addition, the PLD 16 searches for the table 16e, based on a device type or a module type included in the individual information 12b, reads out a normal operation voltage and a lower limit operation voltage corresponding to the device type of module type of the cache memory 12, and sets the normal operation voltage and the lower limit operation voltage in the voltage setting register 16c. For example, in a case where the device type of the cache memory 12 is DDR3_SDRAM and the module type of the cache memory 12, for example, the module voltages thereof are 1.5 V, 1.35 V, and 1.25 V, a normal operation voltage, 1.5 V, and a lower limit operation voltage, 1.25 V, are searched for from the table 16e illustrated in FIG. 7 and set in the voltage setting register 16c.

As illustrated in FIG. 5, in the voltage setting register 16c, a normal operation voltage, a lower limit operation voltage, and a minimum operation voltage, described later, are set by the PLD 16. The normal operation voltage and the lower limit operation voltage are those read out from the table 16e by the PLD 16, as described above. In the voltage setting register 16c illustrated in FIG. 5, as the normal operation voltage, the lower limit operation voltage, and the minimum operation voltage, for example, 1.5 V (10110010), 1.25 V (10011001), and 1.55 V (10110111) are set, respectively.

As illustrated in a remarks column in FIG. 5, the normal operation voltage is a voltage used in causing the cache memory 12 to operate in a high-performance mode (normal operation mode). The high-performance mode is a mode in which the cache memory 12 operates at a maximum operation frequency by maximizing the operation voltage of the cache memory 12. At the time of the normal operation, the PLD 16 instructs the DDC 19a to convert an input voltage (refer to the 12 V in FIG. 2) into the normal operation voltage.

As illustrated in a remarks column in FIG. 5, the lower limit operation voltage is a voltage used in causing the cache memory 12 to operate in a power saving mode (restriction operation mode). The power saving mode is a mode in which, by reducing the operation frequency of the cache memory 12, the operation voltage of the cache memory 12 is reduced and power consumption is suppressed. At the time of a power failure, the PLD 16 instructs the DDC 19a to convert an input voltage (refer to the VCAP or the VBAT in FIG. 2) into the lower limit operation voltage.

The minimum operation voltage is used as a predetermined value serving as a comparison reference in determining, based on the output voltage of the capacitor 15, the timing of switching from a memory backup mode to a cache destage mode. The minimum operation voltage is calculated by the PLD 16, based on a higher one out of the operation voltage (operation voltage information 16b) of the PLD 16 read out from the EEPROM 16a by the PLD 16 and the lower limit operation voltage of the cache memory 12. For example, in a case where the operation voltage of the PLD 16 is 1.2 V and the lower limit operation voltage of the cache memory 12 is 1.25 V as illustrated in FIG. 5, the PLD 16 calculates and sets, as the minimum operation voltage, a value, 1.55 V, in the voltage setting register 16c as illustrated in FIG. 5, the value, 1.55 V, being obtained by adding the value of the amount of the voltage conversion of the DDC 19a, for example, +0.3 V, to the value, 1.25 V, of a higher one out of these operation voltages. The PLD 16 determines that a time when the output voltage of the capacitor 15 has fallen below the minimum operation voltage is the timing of switching from the memory backup mode to the cache destage mode.

Figure 11:
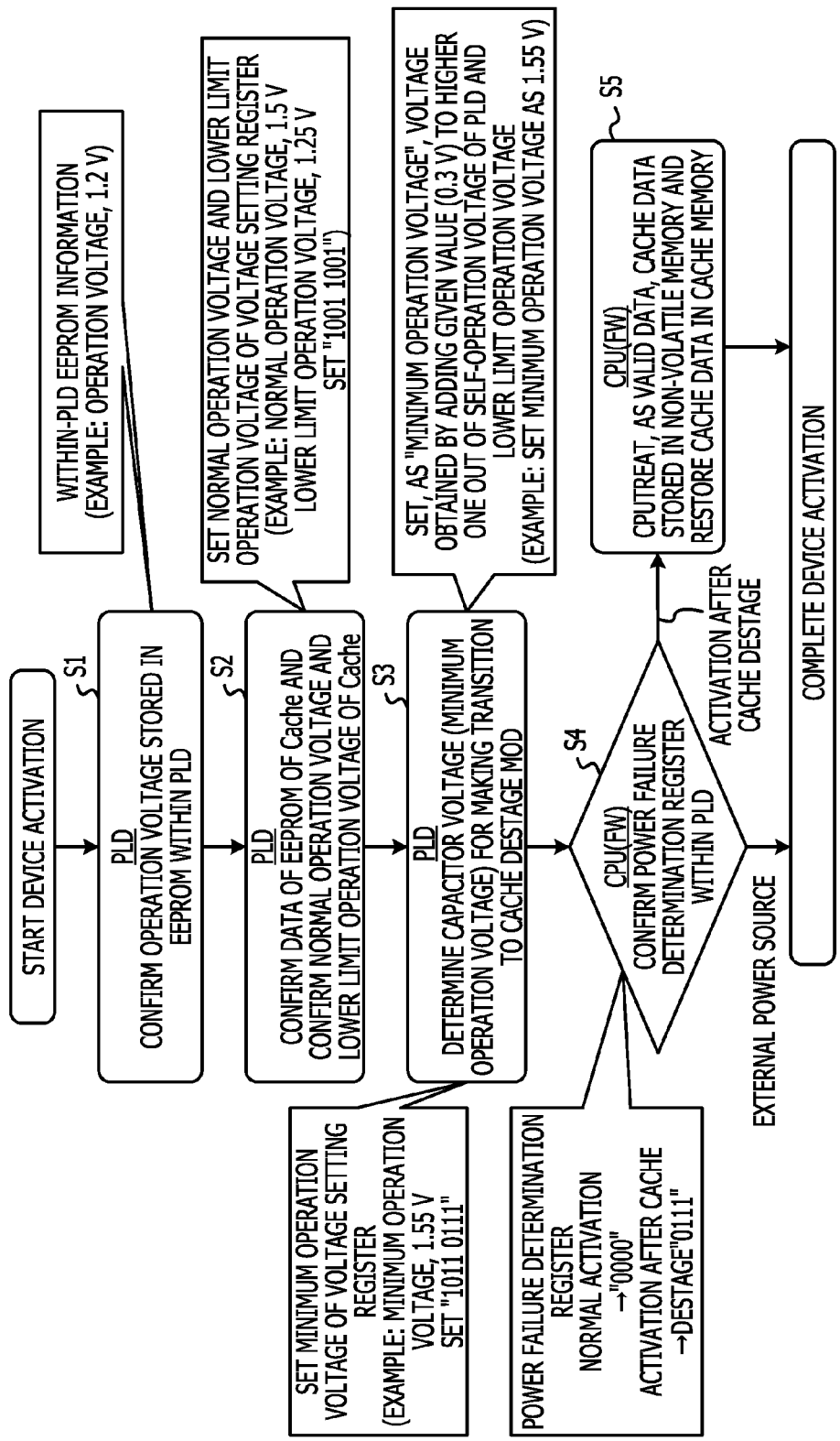
FIG. 11 is a flowchart explaining an operation at the time of activation of a storage device in the present embodiment.
Figure 12:
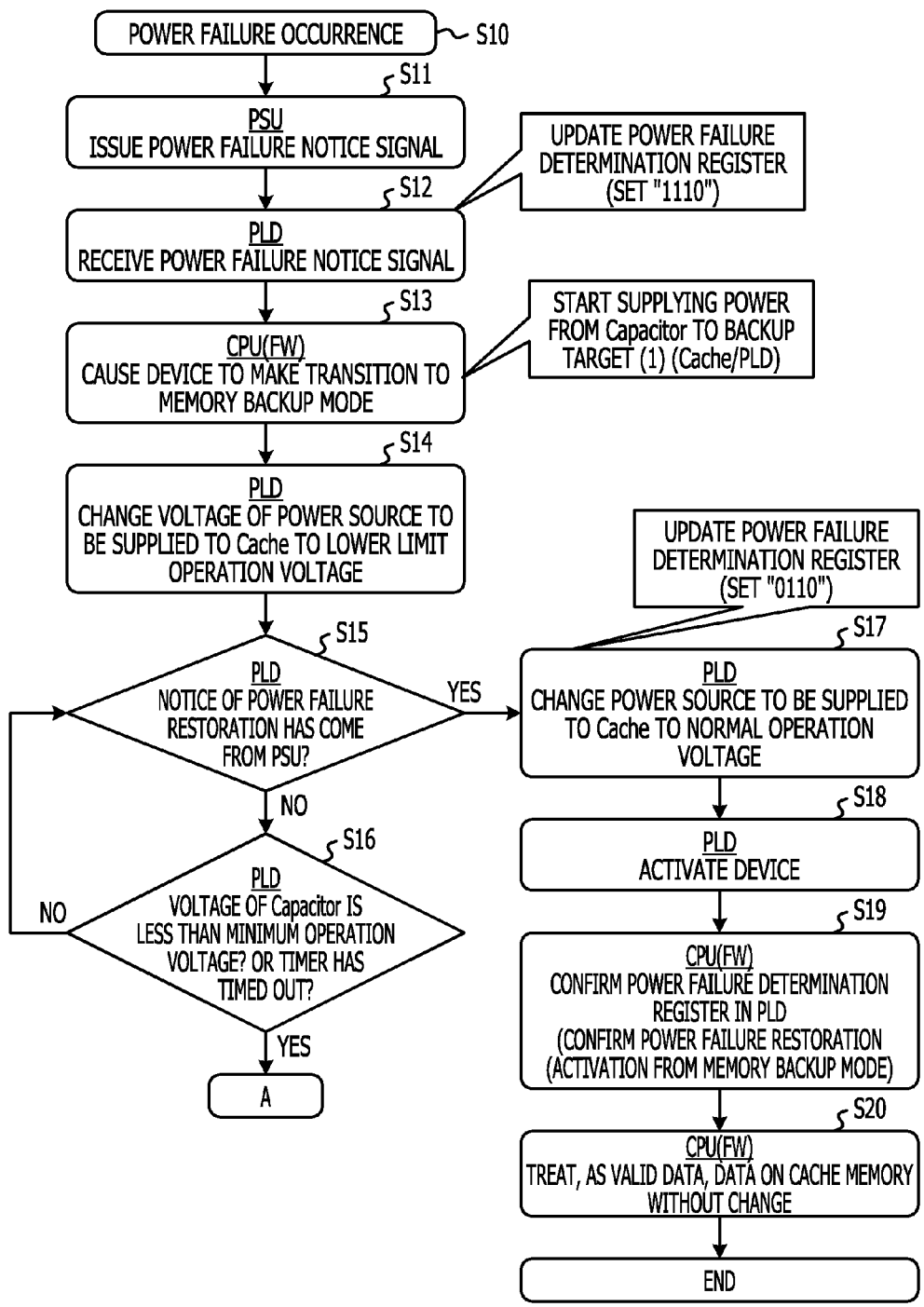
FIG. 12 is a flowchart explaining an operation at the time of a power failure of a storage device in the present embodiment.
Figure 13:
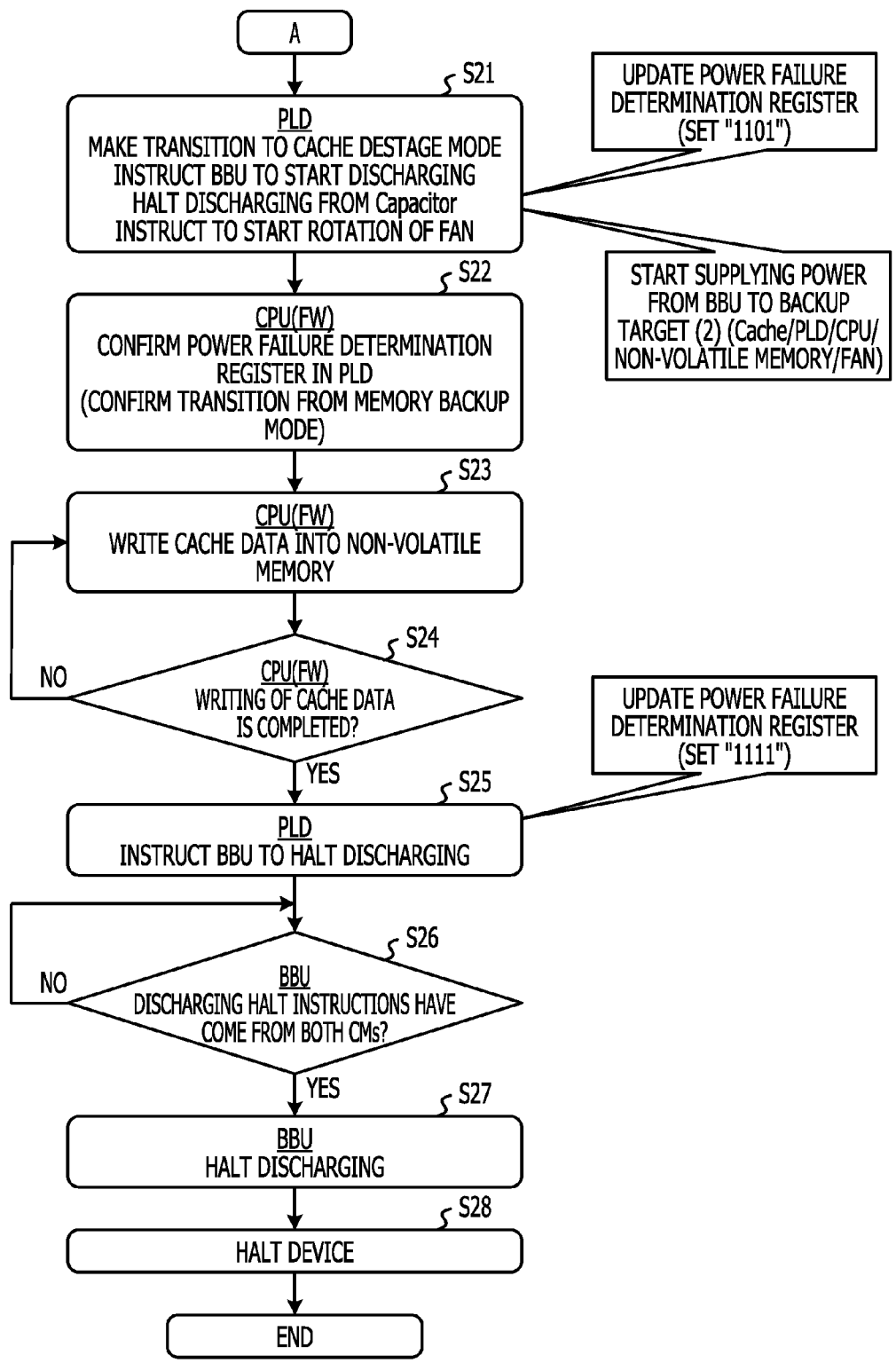
FIG. 13 is a flowchart explaining an operation at the time of a power failure of a storage device in the present embodiment.

As illustrated in FIG. 6, when the PLD 16 performs processing in accordance with procedures illustrated in FIG. 11 to FIG. 13, the PLD 16 updates and sets, in the power failure determination register 16d, pieces of 4-bit data indicating device states. As described later, the CPU (second control unit) 11 performs processing in accordance with procedures illustrated in FIG. 11 to FIG. 13, with recognizing a device state by arbitrarily referencing and confirming 4-bit data in the power failure determination register 16d in the PLD 16.

In addition, FIG. 6 illustrates an example of four types of 4-bit data to be set in the power failure determination register 16d. The first bit of the O-bit data indicates an input power source state, indicates, in the case of "0", that the input power source (external power source) normally functions, and indicates, in the case of "1", that the input power source is in a power failure state. The second of the 4-bit data indicates a power failure occurrence history, indicates, in the case of "0", that a power failure has not yet occurred, and indicates, in the case of "1", that the power failure has occurred. The third and fourth bits of the 4-bit data indicate an activation mode, indicates, in the case of "00", normal activation, indicates, in the case of "01", activation in making a transition from the memory backup mode to the cache destage mode, indicates, in the case of "10", activation from the memory backup mode, and indicates, in the case of "11", activation after the cache destage mode.

Accordingly, 4-bit data, "0000", indicates normal activation. 4-bit data, "1101", indicates activation in making a transition from the memory backup mode to the cache destage mode owing to a prolonged period of a power failure. 4-bit data, "0110", indicates restoration of power from a short-time power failure and activation from the memory backup mode. 4-bit data, "0111", indicates restoration of power from a long-time power failure and activation after the cache destage mode.

In addition, while not illustrated in FIG. 6, 4-bit data, "1110", is set by the PLD 16 when a power failure notice signal has been received from the PSU 20, and the 4-bit data, "1110", indicates a state of being in the short-time power failure and not having been subjected to the restoration of power. 4-bit data, "1111", is set by the PLD 16 when writing cache data into the non-volatile memory 13 in the cache destage mode has been completed and an instruction to halt discharging of the BBU 30 has been issued, and the 4-bit data, "1111", indicates a state of being in the long-time power failure and not having been subjected to the restoration of power.

Next, the operations of the storage device 1 and the CE (control device) is configured in such a way as described above in the present embodiment will be described with reference to FIG. 11 to FIG. 14.

In accordance with a flowchart (steps S1 to S5) illustrated in FIG. 11, the operations of the storage device 1 and the CE 1a at the time of the activation thereof in the present embodiment will be described.

At the time of device activation, first the PLD 16 references and confirms a self-operation voltage, for example, 1.2 V, included in the operation voltage information 16b stored in the EEPROM 16a in the PLD 16 (step S1).

In addition, the PLD 16 confirms the individual information 12b in the EEPROM 12a in the cache memory 12, searches the table 16e, based on information included in the individual information 12b, and confirms, reads out, and sets the normal operation voltage and the lower limit operation voltage of the cache memory 12, in the voltage setting register 16c (step S2). Here, for example, 1.5 V (10110010) is set as the normal operation voltage, and 1.25 V (10011001) is set as the lower limit operation voltage.

Furthermore, the PLD 16 determines the output voltage (minimum operation voltage) of the capacitor 15 to serve as a reference used for determining a timing of making a transition from the memory backup mode (memory backup processing) to the cache destage mode (cache destage processing), and sets the output voltage (minimum operation voltage) of the capacitor 15 in the voltage setting register 16*c* (step S3). Here, as described above, the minimum operation voltage is calculated as a value, for example, 1.55 V, the value being obtained by adding a given value of the amount of the voltage conversion of the DDC 19*a*, for example, +0.3 V, to a higher one out of the self-operation voltage of the PLD 16, for example, 1.2 V, read out from the EEPROM 16*a*, and the lower limit operation voltage of the cache memory 12, for example, 1.25 V, set in the voltage setting register 16*c*.

After this, the CPU 11 references the power failure determination register 16*d* within the PLD 16, and determines whether current activation is normal activation or activation after cache destage (step S4). At this time, in a case where the 4-bit data in the power failure determination register 16*d* is "0000", the CPU 11 determines that the current activation is the normal activation, and completes device activation processing. In this case, previous halt processing has been normally performed, and writing cache data into the disk is has been completed before the halt processing. Therefore, differently from the after-mentioned operation at the time of a power failure, writing the cache data into the disk is may not be performed at the time of the activation.

On the other hand, in a case where the 4-bit data in the power failure determination register 16*d* is "0111", the CPU 11 determines that the current activation is performed after restoration of power from a power failure and activation after the cache destage. In addition, after having treated, as valid data, the cache data stored in the non-volatile memory 13 and restored the cache data in the cache memory 12, the CPU 11 writes, into the disk 1*c*, the cache data written back into the cache memory 12 (step S5), and completes the device activation processing. In addition, when the CPU 11 has completed the writing of the cache data into the disk 1*c*, the PLD 16 updates and sets the 4-bit data in the power failure determination register 16*d* from "0111" to "0000".

When the device activation processing has been completed, the storage device 1 starts a normal operation. In addition, as illustrated in FIG. 8, the PSUs 20 generate system power, based on external power sources supplied from the outside of the device, and supply the system power to the individual CMs 10 to cause the device 1 to operate. At the same time as this, the PSUs 20 perform charging of the individual BBUs 30 and the capacitors 15.

Next, in accordance with flowcharts (steps S10 to S28) illustrated in FIG. 12 and FIG. 13, the operations of the storage device 1 and the CE 1*a* at the time of a power failure in the present embodiment will be described.

When a power failure has occurred in the storage device 1 (step S10) and no external power source has been supplied to the PSUs 20, the PSUs 20 notify the PLDs 16, the BBUs 30, and so forth of power failure notice signals (step S11).

When having received the power failure notice signal from the PSU 20, the PLD 16 updates and sets the 4-bit data in the power failure determination register 16*d* from "0000" to "1110", and issues an instruction to the CPU 11 to execute the memory backup processing (step S12).

When having received, from the PLD 16, the instruction to execute the memory backup processing, the CPU 11 executes the memory backup processing, and causes the device 1 to make a transition to the memory backup mode (step S13). Along with this, as illustrated in FIG. 9, charging of the BBUs 30 is halted, discharging of the capacitor 15 is started, and a power source (refer to the voltage VCAP in FIG. 2) from the capacitor 15 is supplied to the cache memory 12 and the PLD 16 included in the backup target (1). Owing to this, the memory backup processing is executed by the CPU 11, and the cache memory 12 holds the cache data with being controlled by the PLD 16. At this time, using the DDC 19*a*, the PLD 16 changes the voltage of a power source to be supplied to the cache memory 12, to the lower limit operation voltage set in the voltage setting register 16*c* (step S14), and suppresses power consumption. In addition, in a case of utilizing the above-mentioned timer function, the PLD 16 starts timing based on the above-mentioned timer function at the time of making a transition to the memory backup mode in the step S13 or at the time of the reception of the power failure notice signal in the step S12.

After this, the PLD 16 monitors whether or not a notice of power failure restoration has been received from the PSU 20 (step S15), and in a case where no notice of power failure restoration has been received (step S15: NO Route), the PLD 16 performs the following determination (step S16). In other words, the PLD 16 determines whether the output voltage of the capacitor 15 has fallen below the minimum operation voltage set in the voltage setting register 16*c* or a predetermined time has elapsed with respect to a timing result based on the above-mentioned timer function.

In a case where the output voltage of the capacitor 15 is greater than or equal to the minimum operation voltage or in a case where the predetermined time has not elapsed with respect to a timing result based on the above-mentioned timer function (step S16: NO Route), the PLD 16 returns to the processing operation in the step S15 and monitors whether or not a notice of power failure restoration has been received from the PSU 20, with maintaining the memory backup mode.

When the PLD 16 has received a notice of power failure restoration from the PSU 20 along with the resolution of a power failure state while the output voltage of the capacitor 15 remains greater than or equal to the minimum operation voltage or the predetermined time has not elapsed with respect to a timing result based on the above-mentioned timer function (step S15: YES Route), the PLD 16 and the CPU 11 perform the following processing (steps S17 to S20).

In other words, the PLD 16 updates and sets the 4-bit data, "1110", in the power failure determination register 16*d*, to "0110" indicating restoration of power from a short-time power failure and activation from the memory backup mode. In addition, using the DDC 19*a*, the PLD 16 changes the voltage of a power source to be supplied to the cache memory 12, to the normal operation voltage set in the voltage setting register 16*c* (step S17). After that, the PLD 16 activates the device 1 (step S18). Along with this, the CPU 11 references the power failure determination register 16*d* in the PLD 16, and recognizes that the 4-bit data is "0110" indicating power failure restoration, in other words, activation from the memory backup mode (step S19). In addition, the CPU 11 treats, as valid data, the cache data on the cache memory 12 without change, and performs writing into the disk is (step S20). After this, the PLD 16 updates and sets the 4-bit data in the power failure determination register 16*d* from "0110" to "0000", and the storage device 1 terminates processing corresponding to a power failure, and resumes such a normal operation as illustrated in FIG. 8.

On the other hand, in a case where the power failure state is not resolved even if the output voltage of the capacitor 15 has fallen below the predetermined value after the execution of the memory backup processing or the predetermined time has elapsed after the execution of the memory backup processing (step S16: YES Route), the PLD 16 performs the following processing to make a transition from the memory backup mode to the cache destage mode (step S21).

In other words, the PLD 16 updates and sets the 4-bit data in the power failure determination register 16d from "1110" to "1101", and issues an instruction to the CPU 11 to execute cache destage processing. In addition, the PLDs 16 instruct the individual BBUs 30 to start discharging, halt discharging from the capacitors 15, and instruct to start the rotation of the fans 14. Owing to this, as illustrated in FIG. 10, the discharging of the capacitors 15 is halted, the discharging of the individual BBUs 30 is started, and power sources (refer to the voltage VBAT) from the individual BBUs 30 are supplied to the CPUs 11, the cache memories 12, the non-volatile memories 13, the fans 14, and the PLDs 16 included in the backup targets (2). Since, in the cache destage processing, the CPU 11 is activated and the amount of heat generation increases, the fan 14 is driven here.

The CPU 11 is activated and firmware is launched. In addition, when having received, from the PLD 16, an instruction to execute the cache destage processing, the CPU 11 references the power failure determination register 16d within the EEPROM 16a, and recognizes that the 4-bit data is "1101" indicating activation associated with transition from the memory backup mode to the cache destage mode (step S22). After this, the CPU 11 executes the cache destage processing, and writes the cache data from the cache memory 12 into the non-volatile memory 13 (step S23).

The CPU 11 monitors the completion of writing of the cache data (step S24), and in a case where the writing of the cache data is not completed (step S24: NO Route), the CPU 11 returns to the processing operation in the step S23, and writes the cache data from the cache memory 12 into the non-volatile memory 13. In addition, when the CPU 11 has completed the writing of the cache data (step S24: YES Route), the PLD 16 updates and sets the 4-bit data in the power failure determination register 16d from "1101" to "1111" indicating a state of being in the long-time power failure and not having been subjected to the restoration of power. In addition, the PLD 16 instructs the individual BBUs 30 to halt discharging (step S25).

Each BBU 30 determines whether or not discharging halt instructions have been received from all the CMs 10 (the two CMs 10 in the present embodiment) (step S26). Each BBU 30 waits until discharging halt instructions are received from all the CMs 10 (step S26: NO Route), and when having received discharging halt instructions from all the CMs 10 (step S26: YES Route), each BBU 30 halts discharging (step S27), and the storage device 1 is put into a halting state (step S28). In addition, after this, when a long-time power failure state has been resolved, the 4-bit data in the power failure determination register 16d is updated and set from "1111" to "0111" at an adequate timing, and the storage device 1 is reactivated in accordance with the flowchart illustrated in FIG. 11.

Next, with reference to a timing chart illustrated in FIG. 14, the operations of the storage device 1 and the CE 1a at the time of a long-time power failure in the present embodiment will be described. In addition, in FIG. 14, symbols S11 to S16 and S21 to S27 correspond to the step numbers S11 to S16 and S21 to S27, respectively, in FIG. 12 and FIG. 13.

Figure 14:
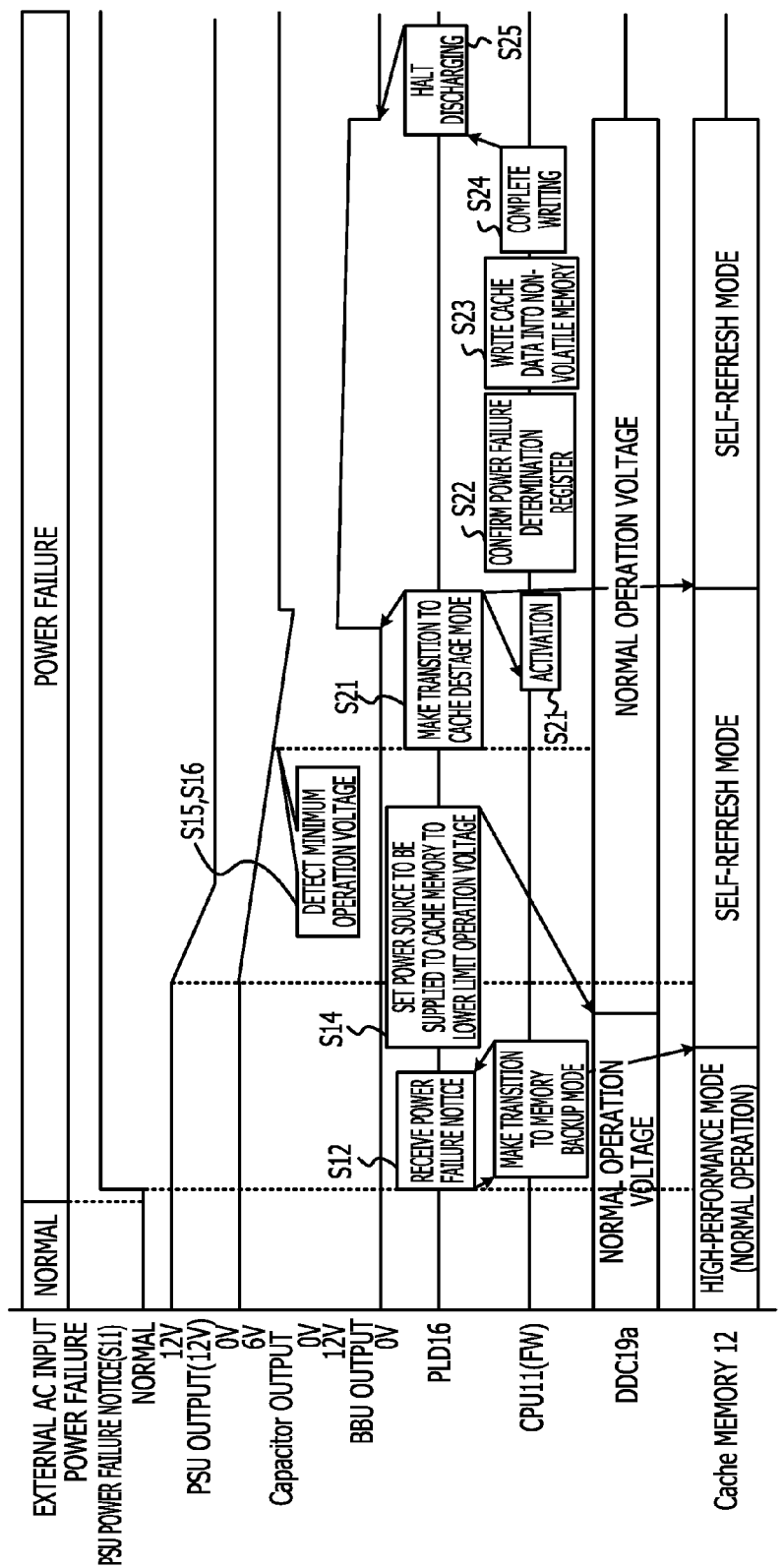
FIG. 14 is a flowchart explaining an operation at the time of a long-time power failure of a storage device in the present embodiment.
Figure 15:
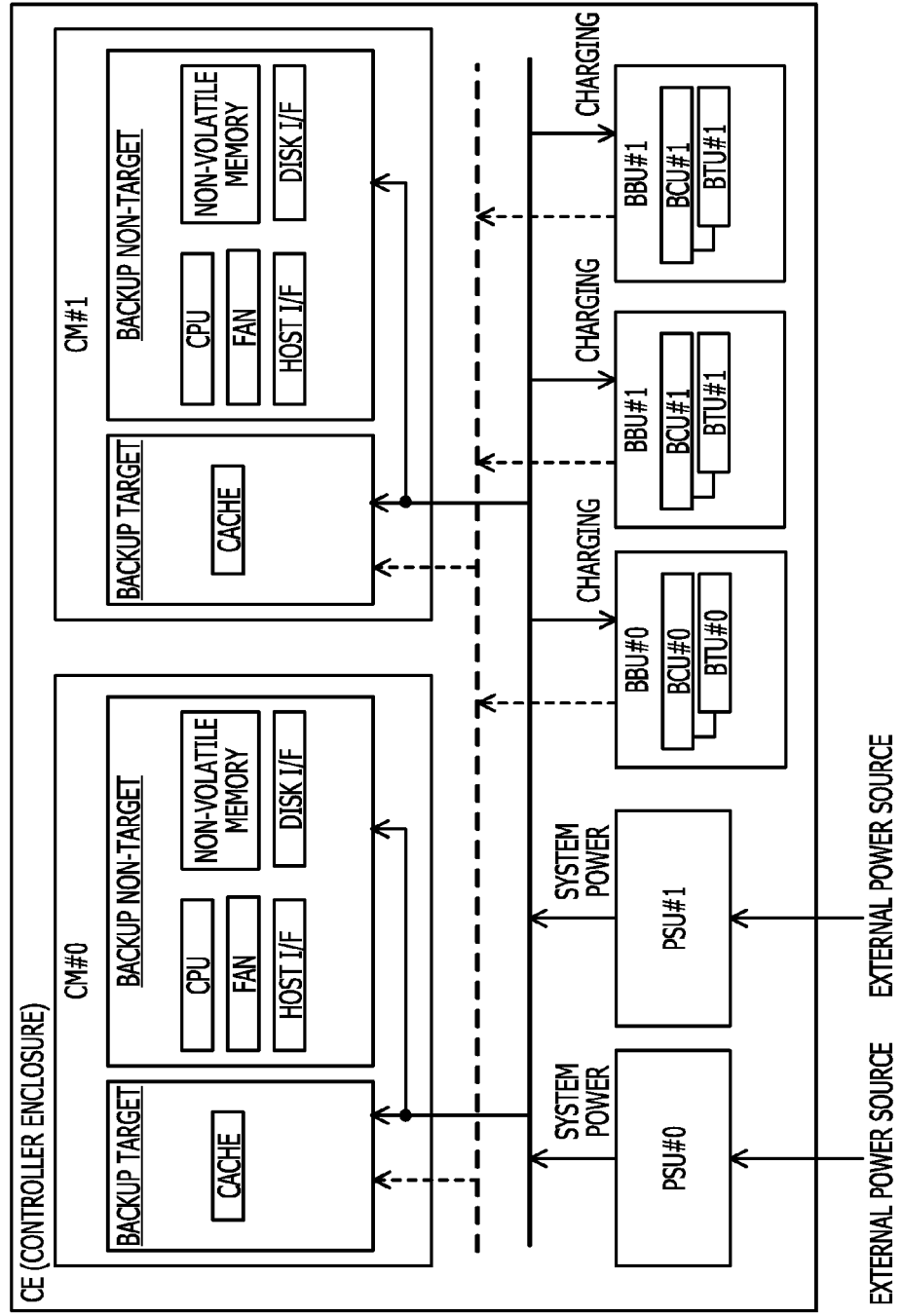
FIG. 15 is a diagram illustrating a power system at the time of a normal operation of a storage device to which a memory backup method is applied.
Figure 16:
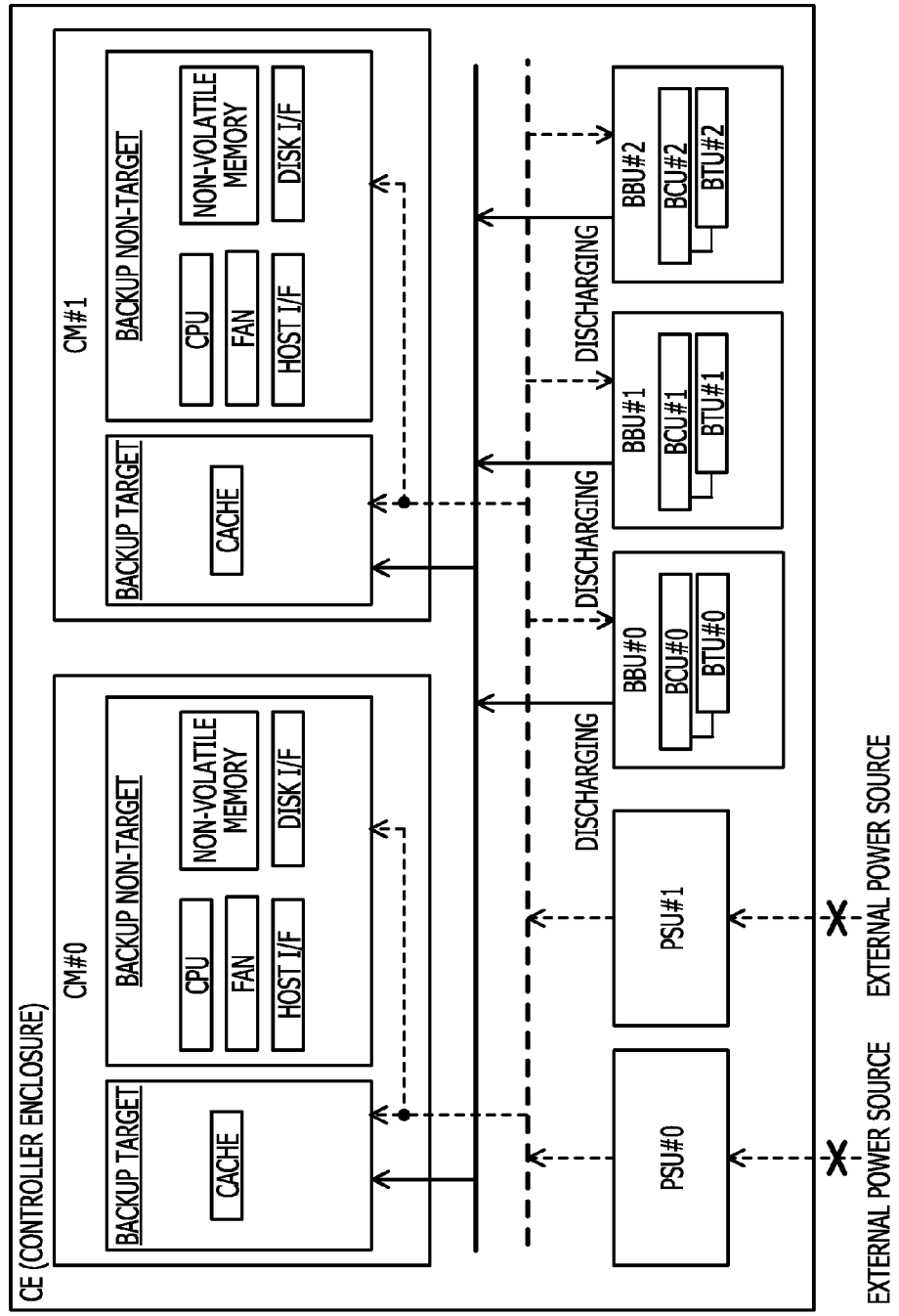
FIG. 16 is a diagram illustrating a power system at the time of a power failure of a storage device to which a memory backup method is applied.
Figure 17:
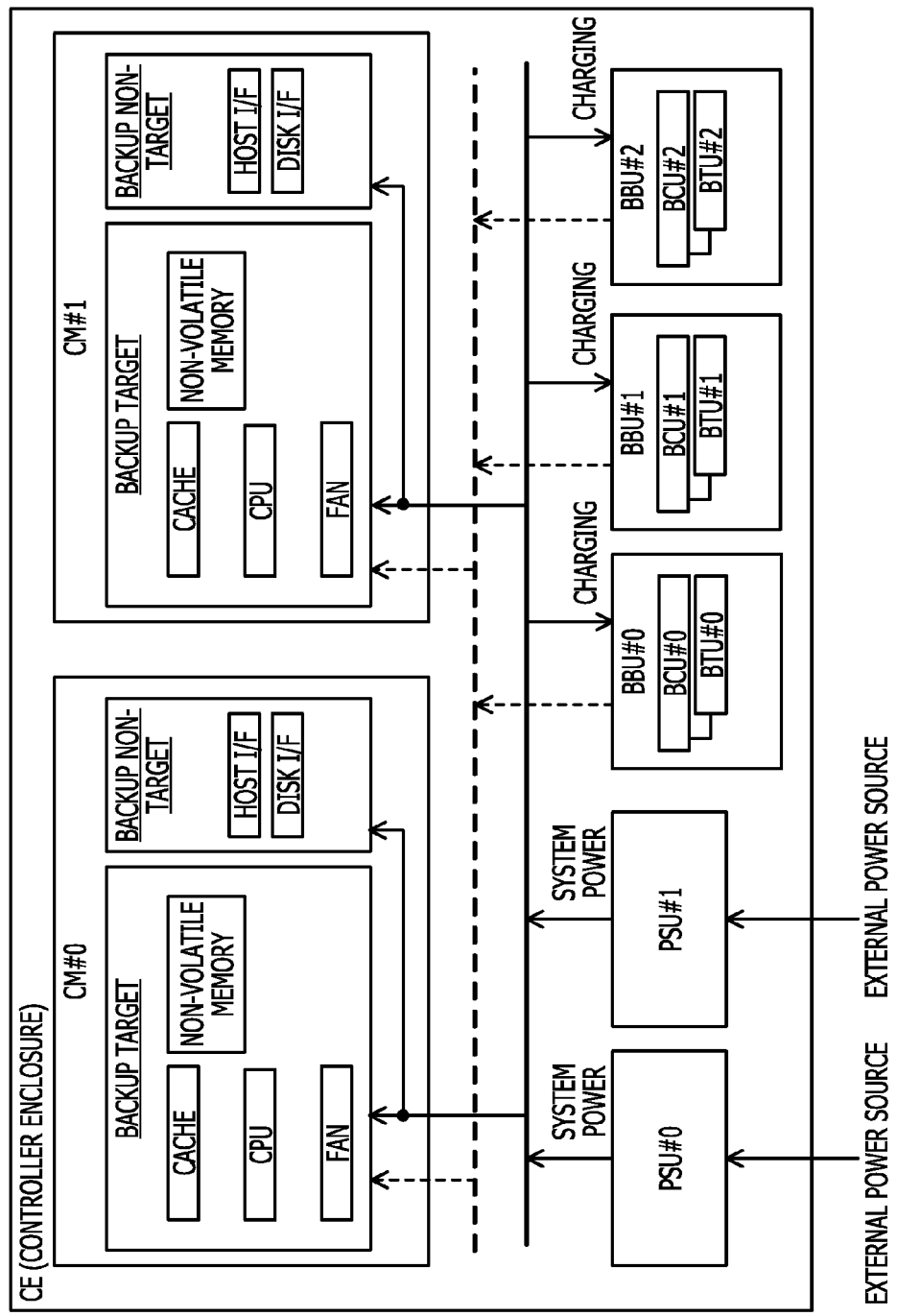
FIG. 17 is a diagram illustrating a power system at the time of a normal operation of a storage device to which a cache destage method is applied.
Figure 18:
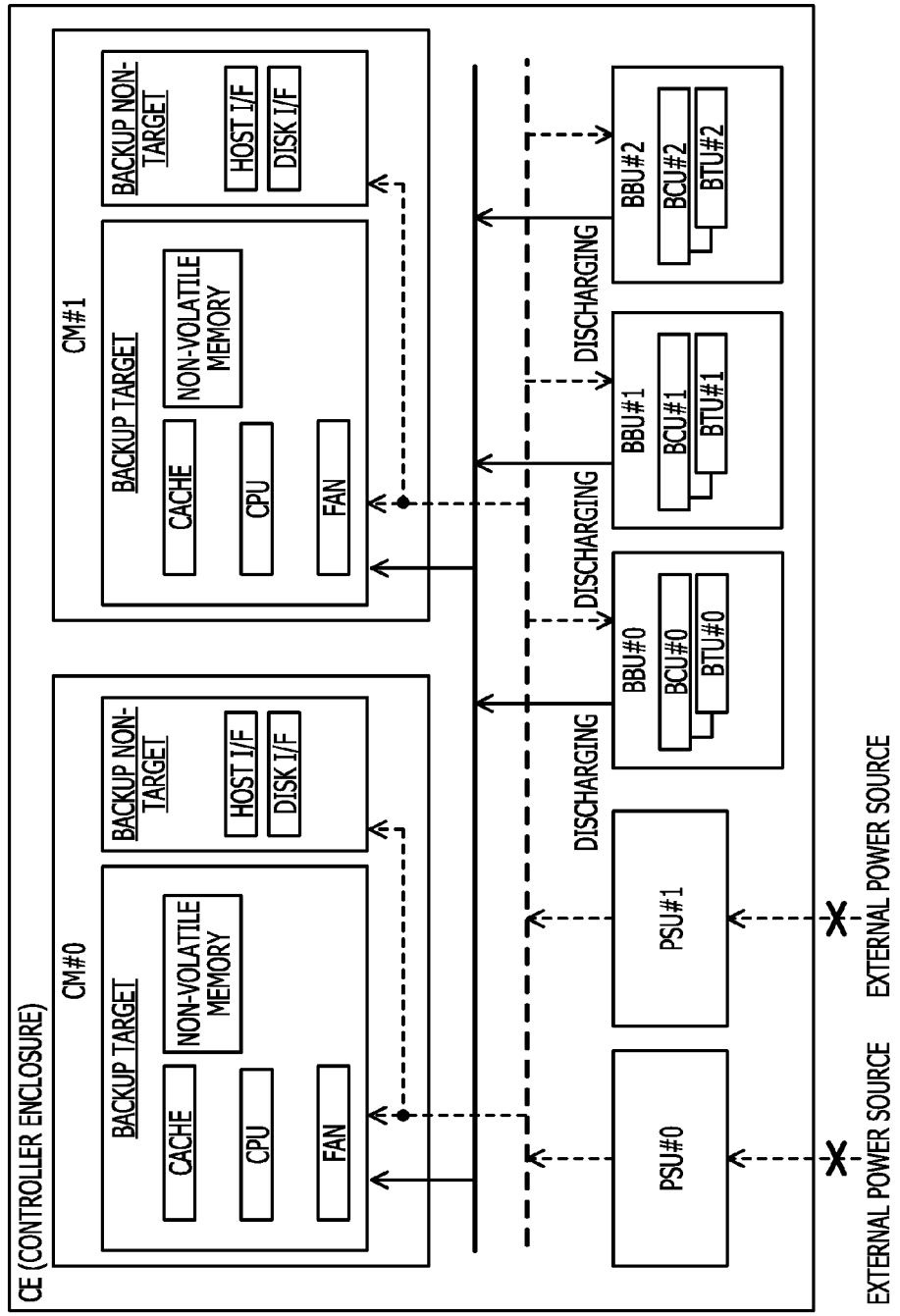
FIG. 18 is a diagram illustrating a power system at the time of a power failure of a storage device to which a cache destage method is applied.

As illustrated in FIG. 14, when a power failure has occurred in the storage device 1 and no external power source has been supplied to the PSUs, the PSUs 20 notify the PLDs 16 of power failure notice signals (S11). When having received the power failure notice signal from the PSU 20, the PLD 16 issues an instruction to the CPU 11 to execute the memory backup processing (S12).

When having received, from the PLD 16, the instruction to execute the memory backup processing, the CPU 11 makes a transition from the normal operation to the memory backup mode (step S13). Along with this, the cache memory 12 makes a transition from a high-performance mode (the normal operation) to a self-refresh mode, and holds the cache data with being power-fed from the capacitor 15 and controlled by the PLD 16. At this time, power supply to the CPU 11, the non-volatile memory 13, the fan 14, the capacitor 15, the host I/F 17, and the disk I/F 18 has been halted. In addition, the self-refresh mode is a mode of keeping power consumption low by deactivating a clock and automatically executing a refresh operation using a refresh counter within the device, and is a mode effective for a case where the cache memory 12 is not accessed, for a long time, while it is desirable to hold data.

When having issued the instruction to the CPU 11 to execute the memory backup processing, the PLD 16 changes the voltage of a power source to be supplied to the cache memory 12, from the normal operation voltage to the lower limit operation voltage, using the DDC 19a (S14). After this, the PLD 16 monitors whether a notice of power failure restoration has been received from the PSU 20 and whether the output voltage of the capacitor 15 has fallen below the minimum operation voltage (S15, S16).

In addition, in a case where a notice of power failure restoration has not been received from the PSU 20 even if the output voltage of the capacitor 15 has fallen below the minimum operation voltage, the PLD 16 makes a transition from the memory backup mode to the cache destage mode, and issues instructions to the CPU 11 and the individual BBUs 30 (S21). Along with this, the individual BBUs 30 start power feeding to the CPUs 11, the cache memories 12, the non-volatile memories 13, the fans 14, and the PLDs 16 in the individual CMs 30, the CPUs 11 are activated (S21), and the cache memories 12 make transitions from the self-refresh mode to the power saving mode (a restriction operation). In addition, the voltage of a power source to be supplied to the cache memory 12 is maintained at the lower limit operation voltage by the DDC 19a to which the power source (the voltage VBAT) from the BBU 30 is input. At this time, power supply to the host I/F 17 and the disk I/F 18 has been halted.

In addition, the CPU 11 references the power failure determination register 16d, and confirms that the 4-bit data is "1101" indicating activation associated with transition from the memory backup mode to the cache destage mode (S22). After this, the CPU 11 executes the cache destage processing, and writes the cache data from the cache memory 12 into the non-volatile memory 13 (S23). When the CPU 11 has completed writing of the cache data (S24), the PLD 16 instructs the individual BBUs 30 to halt discharging (S25). In addition, when having received discharging halt instructions from all the CMs 10, each BBU 30 halts discharging, and the storage device 1 is put into a halting state.

According to the storage device 1 and the CE 1a in the present embodiment, it is possible to achieve the longer operating life of the BBU 30 (BTU 32) serving as a secondary battery (battery). Since, in many power failures, it is possible to terminate the power failures during the protection of the cache data based on the memory backup method, in other words, to restore power, transition to the cache destage method does not occur, the cache destage method being executed by discharging of a secondary battery (discharging of the BBU 30). In other words, in a case of a short-time power failure, the memory backup method based on the power feeding of the capacitor 15 is performed without performing the discharging of the BBU 30, and the cache destage method based on the discharging of the BBU 30 is only executed in a case of a long-time power failure. Accordingly, it is possible to reduce the number of times charging and discharging of the BBU 30 are performed, and it is possible to realize the longer operating life of the BBU 30. Owing to this, it is possible to lengthen the replacement interval of the battery (the BTU 32), based on periodic maintenance, and maintenance costs are reduced.

In addition, in the present embodiment, in the case of a short-time power failure to be restored in a matter of seconds to minutes, the memory backup method is executed based on discharging of the capacitor 15. A time taken for recharging of the capacitor 15 is a matter of several tens of seconds to a minute, recharging after restoration from a power failure is finished in a really short time, and it is possible to complete the charging of the capacitor 15 during the activation of the storage device 1. Accordingly, it is possible to reliably avoid the cache memory 12 from being put into a write through (Write Through) state. In addition, since the write-through state is a state where it is difficult to ensure data held in the cache memory 12, the host 2 is not notified of processing completion until data from the host 2 is written into the disk 1c. Therefore, compared with a write-back (Write Back) state, a processing speed is greatly reduced.

Furthermore, in a case where the storage device 1 and the CE 1a in the present embodiment are applied to a system other than the core system, the BBUs 30 may be detached and the storage device 1 and the CE 1a in the present embodiment may be provided and operated as a model only performing the memory backup processing based on the capacitor 15. Accordingly, it is possible to provide the storage device 1 and the CE 1a according to the system configuration of a user, and it is possible to reduce a facility cost.

In addition, furthermore, in the present embodiment, it is possible to selectively switch and execute any one of the two methods including the memory backup method and the cache destage method, using the CPU 11 and the PLD 16. Therefore, even if a failure has occurred in the capacitor 15 or the BBU 30 (the BTU 32), it is possible for the storage device 1 to continue a write-back state.

While, as above, preferred embodiments of the present technology have been described in detail, the present technology is not limited to such specific embodiments, and may also be implemented with being variously altered or modified without departing from the scope of the present technology.

A computer (examples of which include a CPU, an information processing device, and various kinds of terminals) executes a predetermined application program, and hence, all or part of functions as the control unit 10a, the CPU (second control unit) 11, and the PLD (first control unit) 16, described above, is realized.

In addition, the above-mentioned application program is provided in the form of being recorded in computer-readable recording media such as, for example, a flexible disk, a CD (CD-ROM, CD-R, CD-RW, or the like), a DVD (a DVD-ROM, a DVD-RAM, a DVD-R, a DVD-RW, a DVD+R, a DVD+RW, or the like), a Blu-ray Disc, and so forth. In this case, by reading out the program from the recording medium, transferring the program to an internal memory device or an external memory device, and storing therein the program, the computer uses the program.

Here, the term, computer, is a concept including hardware and an OS, and means hardware operating under control of the OS. In addition, in a case where the OS is not used and an application program independently causes the hardware to operate, the hardware itself corresponds to the computer. The hardware includes at least a microprocessor such as a CPU and a mechanism for reading out a computer program recorded in a recording medium. The above-mentioned application program includes a program code causing such a computer as described above to realize functions as the control unit 10a, the CPU (second control unit) 11, and the PLD (first control unit) 16. In addition, part of the functions may also be realized not by the application program, but by the OS.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processing apparatus comprising:
   a first memory;
   a second memory;
   a battery;
   a capacitor; and
   a processor coupled to the first memory and the second memory and configured to
   when power feeding from an external power source to the processing apparatus is halted, cause power feeding from the capacitor to the first memory, and execute and execute causing the first memory to hold data while power feeding from the battery to the second memory does not start,
   execute at least one of a first process and a second process, the first process including monitoring an output voltage of the capacitor, and determining whether the monitored output voltage of the capacitor reaches a certain value, and the second process including measuring a time period that has elapsed after starting of the power feeding from the capacitor, and determining whether the measured time period reaches a certain time period,
   after the power feeding is caused from the capacitor, cause the battery to start power feeding to the second memory in at least one of
   when the first process is executed and the power feeding from the external power source is not started before the monitored output voltage of the capacitor reaches the certain value, and
   when the second process is executed and the power feeding from the external power source is not started before the measured time reaches the certain time period, and
   start writing the data from the first memory into the second memory after the power feeding from the battery.

2. The processing apparatus according to claim 1, further comprising:
   a third memory;
   wherein
   the first memory is a cache memory for the third memory, and the second memory is a nonvolatile memory.

3. The processing apparatus according to claim 2, wherein the processor includes a programmable logic device configured to issue a first instruction to cause the first memory to hold data while power feeding from the battery to the second memory does not start and issue a second instruction to start writing the data from the first memory into the second memory after the power feeding from the battery.

4. The processing apparatus according to claim 3, wherein the processor includes a central processing unit configured to receive the first instruction and the second instruction from the programmable logic device.

5. The processing apparatus according to claim 4, wherein the power feeding from the battery feeds power to the programmable logic device, the central processing unit, and the first memory.

6. The processing apparatus according to claim 3, wherein the power feeding from the capacitor feeds power to the programmable logic device.

7. The processing apparatus according to claim 3, the programmable logic device sets the first value, based on a higher one out of an operation voltage of the programmable logic device and a lower limit operation voltage of the first memory.

8. The processing apparatus according to claim 3, the processor is configured to write, into the third memory, the data held in the first memory when the power feeding from the external power source has been started during execution of the first instruction.

9. The processing apparatus according to claim 3, the processor is configured to write the data stored in the second memory from the first memory to the third memory after having written back the data into the first memory when the power feeding from the external power source has been started after execution of the second instruction.

10. The processing apparatus according to claim 2, wherein the third memory is a hard disk drive or a solid state drive.

11. The processing apparatus according to claim 1, wherein a first output voltage output from the capacitor is lower than a second output voltage output from the battery.

12. A method executed by a computer including a first memory, a second memory, a battery, and a processor coupled to the first memory and the second memory, the method comprising:
    causing the first memory to hold data, based on power feeding from a capacitor, when power feeding from an external power source is halted while power feeding from the battery to the second memory does not start;
    executing at least one of a first process and a second process, the first process including monitoring an output voltage of the capacitor, and determining whether the monitored output voltage of the capacitor reaches a certain value, and the second process including measuring a time period that has elapsed after starting of the power feeding from the capacitor, and determining whether the measured time period reaches a certain time period,
    after the power feeding is caused from the capacitor, causing the battery to start power feeding to the second memory when at least one of
        the first process is executed and the power feeding from the external power source is not started before the monitored output voltage of the capacitor reaches the certain value, and
        the second process is executed and the power feeding from the external power source is not started before the measured time reaches the certain time period; and
    starting writing the data from the first memory into the second memory after the power feeding from the battery.

13. The method according to claim 12, wherein the first memory is a cache memory for a third memory, and the second memory is a nonvolatile memory.

14. The method according to claim 12, wherein the computer further comprises a third memory, the third memory is a hard disk drive or a solid state drive.

15. A non-transitory computer-readable storage medium storing a program for causing a computer to execute a process, the process comprising:
    executing first processing to cause a first memory to hold data, based on power feeding from a capacitor, when power feeding from an external power source is halted while power feeding from a battery to a second memory does not start;
    executing at least one of a first process and a second process, the first process including monitoring an output voltage of the capacitor, and determining whether the monitored output voltage of the capacitor reaches a certain value, and the second process including measuring a time period that has elapsed after starting of the power feeding from the capacitor, and determining whether the measured time period reaches a certain time period,
    after the power feeding is caused from the capacitor, causing the battery to start power feeding to the second memory when at least one of
        the first process is executed and the power feeding from the external power source is not started before the monitored output voltage of the capacitor reaches the certain value, and
        the second process is executed and the power feeding from the external power source is not started before the measured time reaches the certain time period; and
    starting writing the data from the first memory into the second memory after the power feeding from the battery.

16. The non-transitory computer-readable storage medium according to claim 15, wherein the first memory is a cache memory for a third memory, and the second memory is a nonvolatile memory.

* * * * *